United States Patent
Degalahal et al.

(10) Patent No.: US 10,860,083 B2
(45) Date of Patent: Dec. 8, 2020

(54) SYSTEM, APPARATUS AND METHOD FOR COLLECTIVE POWER CONTROL OF MULTIPLE INTELLECTUAL PROPERTY AGENTS AND A SHARED POWER RAIL

(71) Applicant: Intel Corporation, Santa Clara, CA (US)

(72) Inventors: Vijay S. R. Degalahal, Bangalore (IN); Pronay Dutta, Portland, OR (US); Robert Gough, Beaverton, OR (US); Panner Kumar, Bangalore (IN); Chia-Hung Kuo, Folsom, CA (US); Karthi Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 140 days.

(21) Appl. No.: 16/142,320

(22) Filed: Sep. 26, 2018

(65) Prior Publication Data
US 2019/0041970 A1   Feb. 7, 2019

(51) Int. Cl.
G06F 1/32 (2019.01)
G06F 1/3287 (2019.01)
G06F 1/3296 (2019.01)
G06F 1/3228 (2019.01)
G06F 1/3234 (2019.01)
G06F 9/4401 (2018.01)

(52) U.S. Cl.
CPC .......... *G06F 1/3287* (2013.01); *G06F 1/3228* (2013.01); *G06F 1/3243* (2013.01); *G06F 1/3296* (2013.01); *G06F 9/4401* (2013.01)

(58) Field of Classification Search
CPC .... G06F 1/3287; G06F 1/3228; G06F 1/3243; G06F 1/3296
See application file for complete search history.

(56) References Cited

U.S. PATENT DOCUMENTS

| | | | |
|---|---|---|---|
| 5,163,153 A | 11/1992 | Cole et al. | |
| 5,522,087 A | 5/1996 | Hsiang | |
| 5,590,341 A | 12/1996 | Matter | |

(Continued)

FOREIGN PATENT DOCUMENTS

| | | |
|---|---|---|
| EP | 1 282 030 A1 | 5/2003 |
| JP | 05324130 | 12/1993 |
| KR | 1020160067595 | 6/2016 |

OTHER PUBLICATIONS

Intel Corporation, "Intel 64 and IA-32 Architectures Software Developer's Manual," vol. 3B: System Programming Guide, Sep. 2016, Chapter 14 Power and Thermal Management (14.1-14.9.5), 39 pages.

(Continued)

*Primary Examiner* — Stefan Stoynov
(74) *Attorney, Agent, or Firm* — Trop, Pruner & Hu, P.C.

(57) ABSTRACT

In one embodiment, a system on chip includes: at least one core; a plurality of intellectual property (IP) agents coupled to the at least one core; a shared power rail to provide an operating voltage to the plurality of IP agents; and a power controller, in response to an indication that the plurality of IP agents are in an idle state and the at least one core is in an active state, to power down the shared power rail while the at least one core remains in the active state. Other embodiments are described and claimed.

19 Claims, 17 Drawing Sheets

(56) References Cited

U.S. PATENT DOCUMENTS

| | | |
|---|---|---|
| 5,621,250 A | 4/1997 | Kim |
| 5,931,950 A | 8/1999 | Hsu |
| 6,748,546 B1 | 6/2004 | Mirov et al. |
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 9,823,719 B2 | 11/2017 | Jahagirdar |
| 2001/0044909 A1 | 11/2001 | Oh et al. |
| 2002/0194509 A1 | 12/2002 | Plante et al. |
| 2003/0061383 A1 | 3/2003 | Zilka |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0149977 A1* | 7/2006 | Cooper ............... G06F 1/3296 713/300 |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0300395 A1* | 12/2009 | Chin ................... G06F 1/3287 713/324 |
| 2010/0115309 A1 | 5/2010 | Carvalho et al. |
| 2010/0146513 A1 | 6/2010 | Song |
| 2010/0191997 A1 | 7/2010 | Dodeja et al. |
| 2011/0154090 A1 | 6/2011 | Dixon et al. |
| 2012/0079290 A1 | 3/2012 | Kumar |
| 2012/0246506 A1 | 9/2012 | Knight |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0346774 A1 | 12/2013 | Bhandaru et al. |
| 2014/0068290 A1 | 3/2014 | Bhandaru et al. |
| 2014/0195829 A1 | 7/2014 | Bhandaru et al. |
| 2014/0208141 A1 | 7/2014 | Bhandaru et al. |
| 2015/0067356 A1* | 3/2015 | Trichy Ravi ............ G06F 1/324 713/300 |
| 2017/0177068 A1 | 6/2017 | Cooper et al. |
| 2017/0286247 A1 | 10/2017 | Pappu et al. |
| 2018/0232036 A1 | 8/2018 | Varadarajan et al. |

OTHER PUBLICATIONS

Microsoft Docs, "Device Low-Power States," https://docs.microsoft.com/en-us/windows-hardware/drivers/kernel/device-sleeping-states, Jun. 15, 2017, 1 page.

International Searching Authority, "Notification of Transmittal of the International Search Report and the Written Opinion of the International Searching Authority," dated Dec. 4, 2019, in International application No. PCT/US2019/047620.

* cited by examiner

US 10,860,083 B2

SYSTEM, APPARATUS AND METHOD FOR COLLECTIVE POWER CONTROL OF MULTIPLE INTELLECTUAL PROPERTY AGENTS AND A SHARED POWER RAIL

TECHNICAL FIELD

Embodiments relate to power control in an integrated circuit.

BACKGROUND

In modern systems on chip (SoCs) and processors, it is common for several intellectual property (IP) agents to share a power rail. While each of these IP agents can be individually power controlled, typically at least portions of such IP agents remain powered on even when not busy, due to the possibility of an access from software. Even when an individual IP agent is power gated, power loss occurs due to leakage.

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

Figure 1:
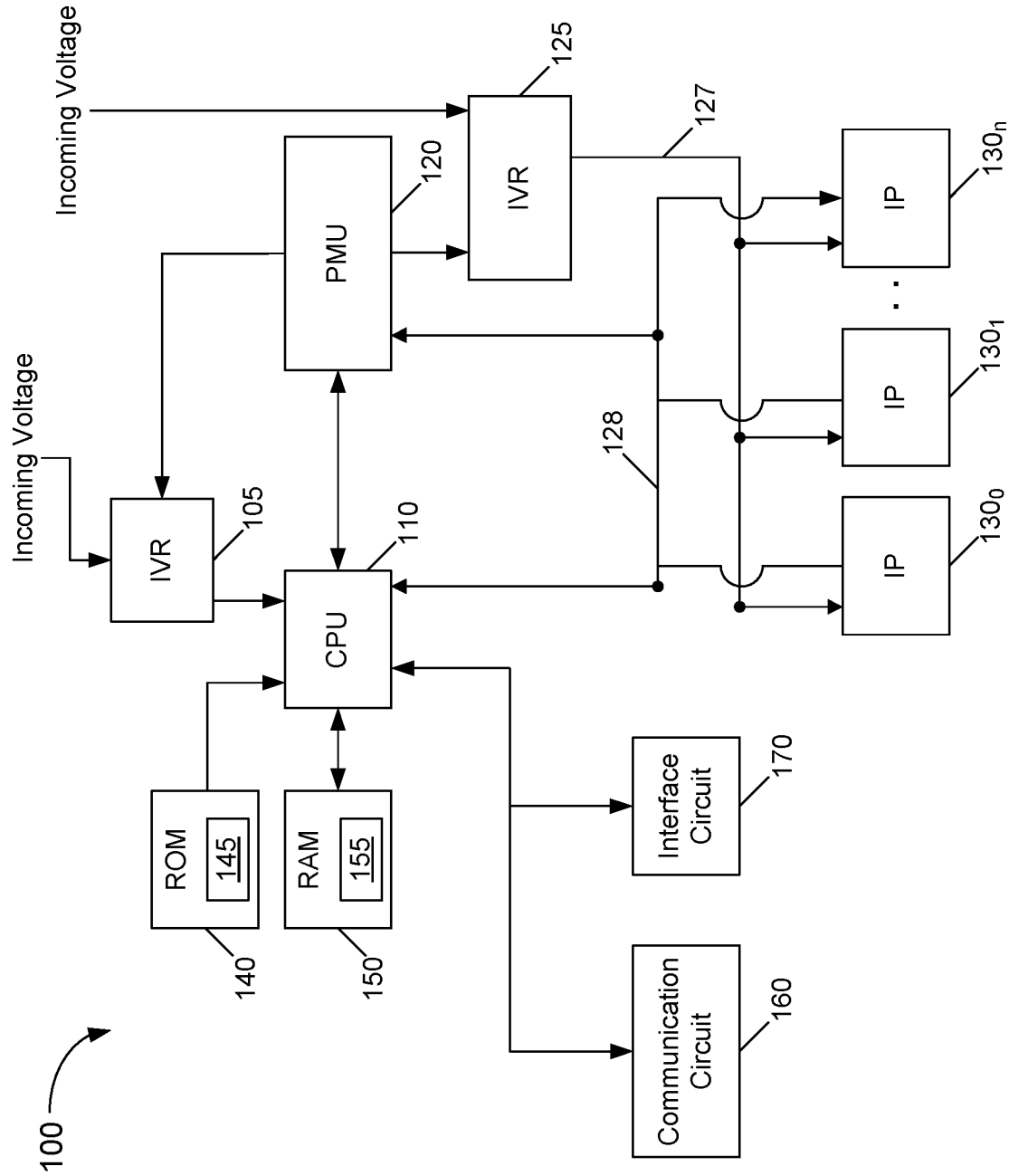
FIG. 1 is a block diagram of a system on chip (SoC) in accordance with an embodiment of the present invention.

In various embodiments, a SoC or other processor having one or more processing units (e.g., one or more general-purpose processor cores) may further include a plurality of intellectual property (IP) agents. Many different types of IP agents may be present in different embodiments. Although the scope of the present invention is not limited in this regard, example IP agents include various on-chip dedicated processing units, interface circuits and so forth. For example, IP agents may include media processors, fixed function processors, sensors of many different varieties, interface circuits, and so forth.

With an SoC as described herein, multiple IP agents may be coupled to a shared power rail. Embodiments provide techniques to enable such multiple IP agents to be power controlled collectively as a group, in addition to being independently power controlled. In this way, greater power savings may be realized by powering down both the IP agents coupled to the shared power rail, and the shared power rail itself, and potentially its power source also. Embodiments may enable such collective power control and powering down of IP agents and shared power rail even when additional portions of the SoC remain in an active, operating state. For example, when the SoC is in a so-called package C0 state, and it is determined that all IP agents coupled to a particular shared power rail are in at least a given low power state, these IP agents and shared power rail may be powered down. And optionally, any allocated power budget for these components can be re-allocated to operating components of the SoC, such as one or more general-purpose processor cores.

In embodiments, a power controller may be configured to perform such group IP agent/power rail powering down when it is determined that all IP agents coupled to a particular shared power rail are in an idle state. To this end, the power controller may cause each IP agent, when idle, to be transitioned into a power gated state in which the IP agent is decoupled by a power gate circuit from receiving an operating voltage from the shared power rail. Then, when the power controller determines that all IP agents coupled to a shared power rail are in at least a particular low power states (e.g., a so-called device low power state such as a device D3 low power state), all access to the IP agents via any shared bus may be blocked. Still further, the power controller may cause both the IP agents and the shared power rail to be powered down. Once in this state, should a software agent seek access to any of the IP agents in the powered down state, the power controller may perform a low power state exit protocol to cause the shared power rail and at least one of the IP agents to exit the idle state and be powered on.

In embodiments, this collective idle state in which both a shared power rail and multiple IP agents are in a low power state can be made visible to system software, e.g., via the power controller. In a particular embodiment, the power controller may communicate an acknowledgment message to an operating system or other system software when this state has been entered, where this state may be identified to the OS as a TC Cold state. With this indication, the operating system or other system software can prevent requesters from accessing such IP agents, at least until a power on protocol completes.

Referring now to FIG. 1, shown is a block diagram of a system on chip (SoC). As shown, SoC 100 includes a variety of different components. As seen, SoC 100 includes a central processing unit (CPU) 110 that in turn may couple to a plurality of intellectual property (IP) agents $130_0$-$130_n$. While a direct coupling between CPU 110 and IP agents 130 is shown for ease of illustration, understand that in some cases a peripheral controller or other hub circuitry may interface between CPU 110 and IP agents 130. In certain cases, such circuitry may be implemented within CPU 110 itself.

Of particular interest herein, note IP agents 130 are coupled to a common or shared power rail 127. More specifically, shared power rail 127 is to provide an operating voltage to IP agents 130. In the embodiment shown, this operating voltage is a regulated voltage received from an integrated voltage regulator (IVR) 125. In turn, IVR 125 receives an incoming voltage from an off-chip source such as a power supply, an external voltage regulator or so forth. Although shown with this particular implementation in FIG. 1, understand that in some cases shared power rail 127 may receive an operating voltage directly from an off-chip source.

In embodiments herein, since IP agents 130 all are coupled to a shared power rail, when all the IP agents are in an idle power state, greater power savings may be realized by powering off shared power rail 127 (and further in some cases powering off IVR 125).

As further illustrated in FIG. 1, power control of IP agents 130, CPU 110 and other components within SoC 100 may be performed by a power management unit (PMU) 120. As illustrated, PMU 120 may control IVR 125 and another IVR 105, which provides a regulated voltage to CPU 110. PMU 120 may be configured to perform ordered powering down and powering up of shared power rail 127 and further to control power activity on a shared bus 128 that acts as a shared communication bus between IP agents 130 and CPU 110.

To realize the ability to dynamically shut down shared power rail 127 in situations when a remainder of SoC 100 is powered on (e.g., in a package C0 or other active power state), PMU 120 may interact with software, such as an operating system (OS) that executes on CPU 110. To this end, this OS may maintain a table listing the power state of IP agents coupled to the shared power rail. As illustrated in FIG. 1 in one embodiment, a table 155 may be maintained within a random access memory 150 to store this information. In an embodiment, table 155 may include a plurality of entries each to identify a corresponding IP agent and an associated power state. To this end, each entry may include at least 2 fields, one field to identify a corresponding IP agent and a second field to identify its power state (e.g., active, idle, or interim power state such as intermediate power states between a fully active state and an idle state (such as a power gate state)). When the OS determines that all IP agents coupled to a shared power rail are in an inactive state, the OS may send an indication to PMU 120 to cause it to shut down the shared power rail, e.g., shared power rail 127. In this way, reduced power consumption may be realized during normal SoC operation. Still further, when in this condition PMU 120 may leverage the power budget otherwise allocated to IP agents 130 to provide additional power budget to other components such as CPU 110 when IP agents 130 and corresponding shared power rail 127 are powered down.

As further illustrated, SoC 110 also includes a read-only memory 140 which may store firmware, such as BIOS or other firmware code. In embodiments herein, such firmware may provide a declaration 145 to the OS which identifies the IP agents that are present on a given shared power rail, such that the power management operations described herein may proceed.

Of course, SoC 100 may include further components. In the embodiment shown, one or more communication circuits 160 may be present. Such communication circuits 160 may include both wired and wireless communication circuits to enable interaction with other devices using wired or wireless techniques. As also illustrated, an interface circuit 170 may provide an interface to other chip components such as other types of processors, peripheral devices or so forth. Understand while shown at this high level in the embodiment of FIG. 1, many variations and alternatives are possible.

Figure 2:
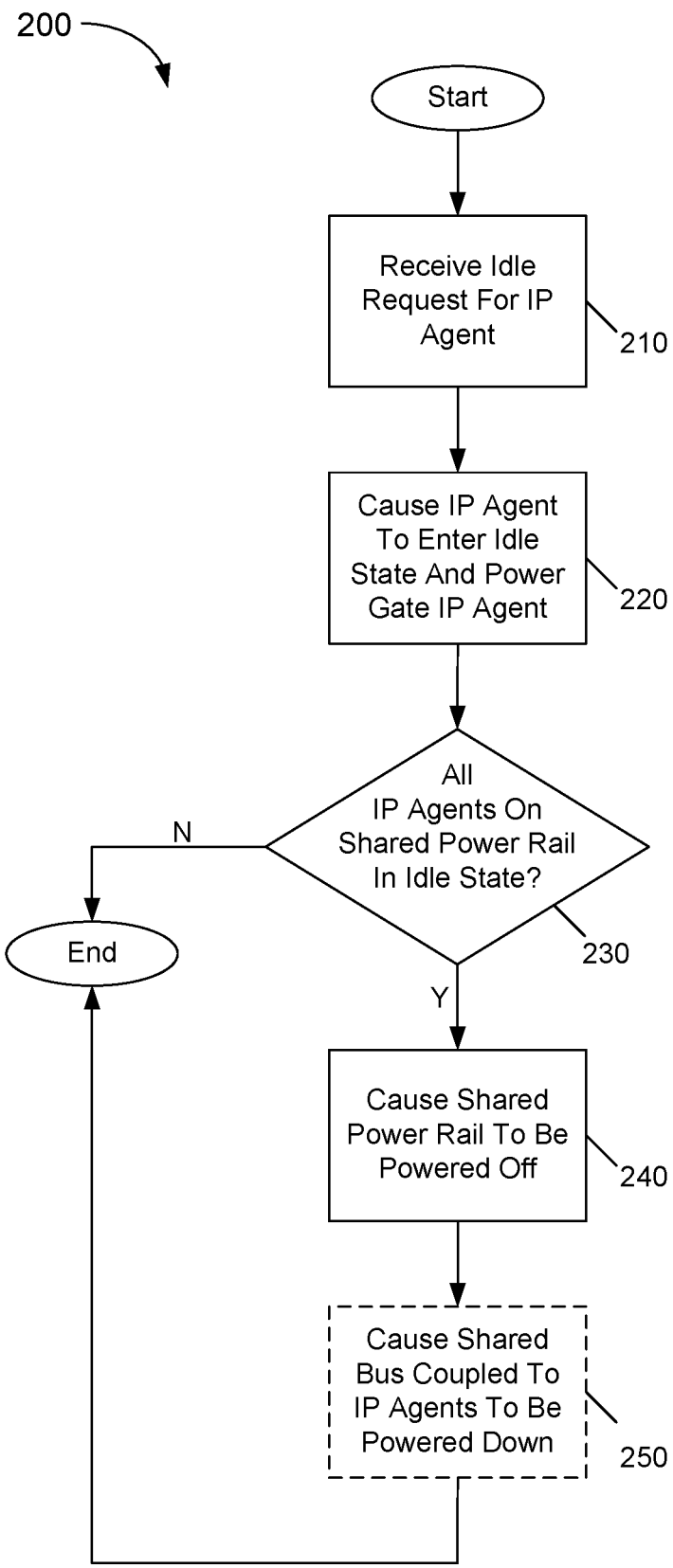
FIG. 2 is a flow diagram of a method in accordance with one embodiment of the present invention.

Referring now to FIG. 2, shown is a flow diagram of a method in accordance with one embodiment of the present invention. As shown in FIG. 2, method 200 is a method for power controlling a shared power rail as described herein. To this end, method 200 may be performed by a power controller such as PMU or other control circuitry. As such, method 200 may be performed by hardware circuitry, firmware software and/or combinations thereof. As illustrated, method 200 begins by receiving a request for an IP agent to enter into an idle state (block 210). Such request may be received, in one embodiment, from a driver for the IP agent. Understand that this driver may itself execute on a host processor, such as a CPU and may request the idle state based on its knowledge of activity or inactivity of the IP agent, e.g. that IP agent is not being used currently and is not expected to be used, e.g., during a current boot cycle, for a threshold duration or so forth.

Next, control passes to block 220 where the IP agent is caused to enter into an idle state and is power gated. To this end, the PMU may initiate activities to cause the IP agent to enter a low power state. Such activities may include sending a low power state command to the IP agent to cause it to perform a shutdown protocol, which may include storing any state present in the IP agent to another location (e.g., an on-chip storage). In response to completing the power down activities, note that the IP agent may send an acknowledgment back to the PMU to indicate that is ready to be powered down. At this point, to reduce power consumption, the PMU may cause the IP agent to be power gated, e.g., by activating a power gate circuit through which the IP agent receives its operating voltage. While this may reduce power consumption, nevertheless there can be leakage.

As such, embodiments may realize additional power savings when it is determined that all IP agents on a shared power rail are in a low power state. Accordingly as further shown in FIG. 2, at diamond 230 it may be determined whether all IP agents on the shared power rail are in an idle state. In an embodiment, the PMU may make this determination in response to receive a message, e.g. from the OS, that indicates that all IP agents of a shared power rail are idle. Thus, the shared power rail (and a shared communication bus, optionally) may be powered down. As such, this determination at diamond 230 may be made in response to receipt of a power rail shutdown message, received from, e.g., firmware that in turn receives a power down request from the OS when it determines that all IP agents coupled to a particular shared power rail are in an idle state.

Still with reference to FIG. 2, if no such message is received this determination diamond 230 is that not all IP agents on the shared power rail are an idle state. Thus no further operations occur with regard to method 200. If it is determined that all IP agents are in the idle state, control passes to block 240 where the shared power rail may be caused to be powered off. To this end, in an embodiment the PMU may send a power down message to an IVR that generates a regulated voltage for the shared power rail to both stop the IVR from outputting the regulated voltage and further, in some cases and depending on what further regulated voltages are provided by the IVR, to cause the IVR itself also to be powered down, reducing power consumption further.

Next at block 250, it is further possible to optionally cause a shared bus to be powered down. For example, when a shared bus only couples to IP agents (or other endpoint agents) that are in an idle state, the shared bus can be powered down. Even though one or more devices, such as a CPU or interface circuit coupled to the shared bus remain in a power on state.

Figure 3:
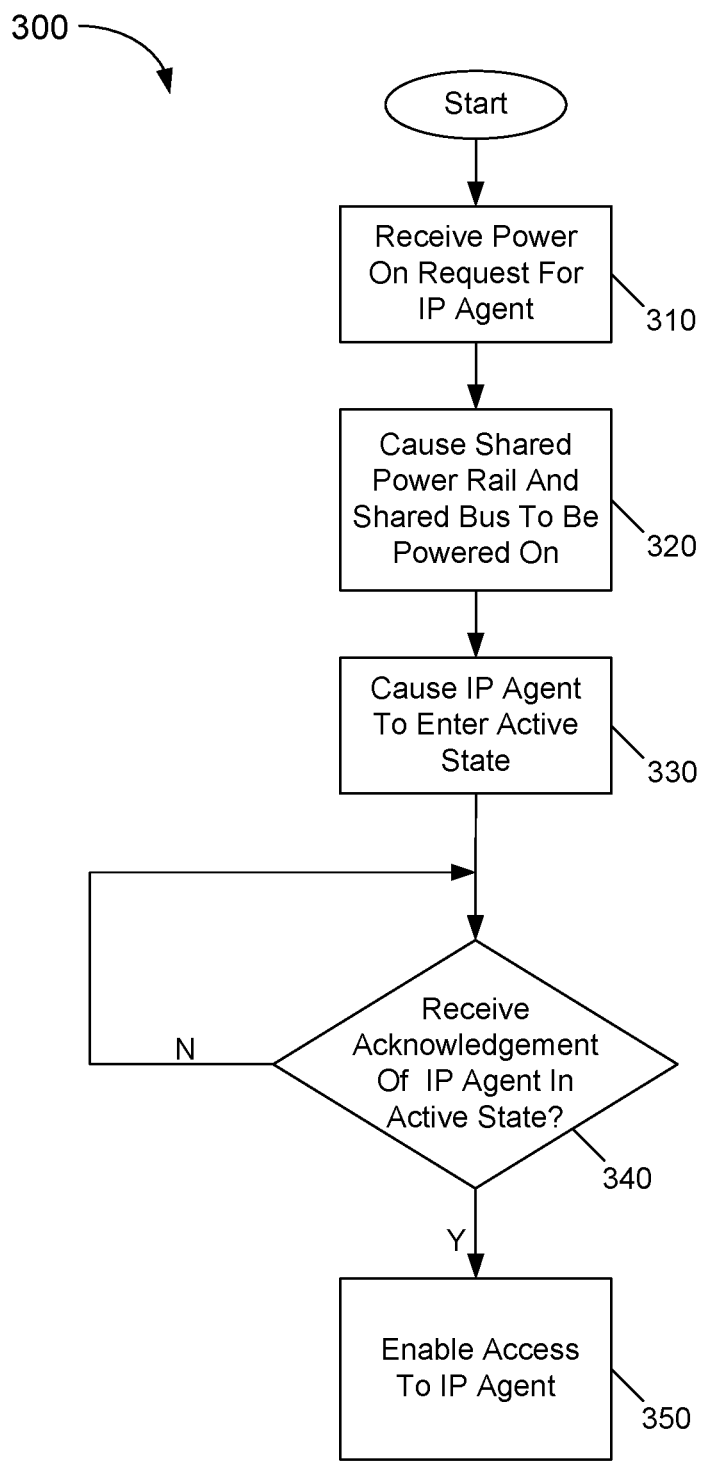
FIG. 3 is a flow diagram of a method in accordance with another embodiment of the present invention.

Referring now to FIG. 3, shown is a flow diagram of a method in accordance with another embodiment of the present invention. More specifically as shown in FIG. 3, method 300 is a method for powering on a shared power rail and one or more IP agents coupled the shared power rail. As such, method 300 may be performed by a power controller such as PMU or other control circuitry, which may be implemented as hardware circuitry, firmware software and/or combinations thereof.

As illustrated, method 300 begins by receiving a request for an IP agent to be powered on from the idle state (block 310). Such request may be received, in one embodiment, from an OS. Next, control passes to block 320 where the PMU may cause the shared power rail (and a shared communication bus, if powered off) to be powered on. Next at block 330, the IP agent is caused to enter an active state.

As illustrated further in FIG. 3, at diamond 340 it is determined whether an acknowledgment has been received that the IP agent is in the active state. In one particular embodiment, this determination may be in response to receipt of an acknowledgment from the IP agent as received, e.g., in the OS. Thereafter, at block 350 access to the IP agent may be enabled. For example, the OS may communicate the power on status such that one or more drivers associated with the IP agent can access the agent. Understand while shown at this high level in the embodiment of FIG. 3, many variations and alternatives are possible.

Figure 4:
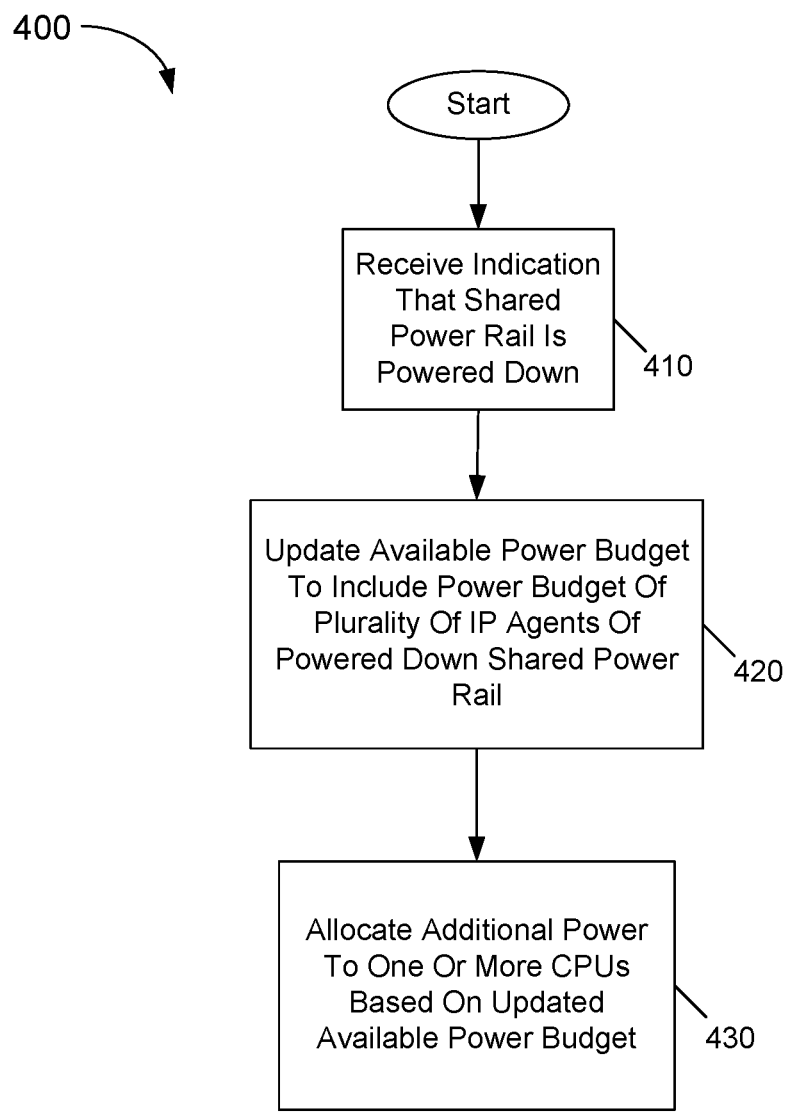
FIG. 4 is a flow diagram of a method in accordance with yet another embodiment of the present invention.

Referring now to FIG. 4, shown is a flow diagram of a method in accordance with yet another embodiment of the present invention. As shown in FIG. 4, method 400 is a method for controlling power consumption in SoC in accordance with an embodiment. As such, method 400 may be performed by a power controller such as PMU or other control circuitry, which may be implemented as hardware circuitry, firmware software and/or combinations thereof.

As illustrated, method 400 begins by receiving an indication that a shared power rail is powered down (block 410). This indication may be received in the PMU, e.g., from the OS that reports, via BIOS or other firmware, that all IP agents coupled to a shared power rail are in an idle state such that the shared power rail itself can be power down.

After activities to power down the rail occur, this indication is thus positive such that control next passes to block 420. At block 420, the PMU may update an available power budget for the SoC. That is, an SoC may have a given allocated power budget in which each component of the SoC is provided with a portion of a total power budget. With multiple IP agents on the shared power rail in a power down state, the allocated power budget for these components becomes available for providing to other components. As such, the available power budget may be updated. For example, assume an SoC has an overall power budget of 15 Watts (W) and that a shared power rail with 3 IP agents consumes 2 W of that total power budget. When the shared power rail and the IP agents are powered down, this 2 W becomes additional available power budget for the SoC, in an embodiment. Without an embodiment, assume only 8 W is allocated for the cores, which enables them to run at 2 GHz. Instead, with an embodiment in which the 3 IP agents on the shared power rail are powered down, the cores can receive an additional 2 Watts, and realize a performance boost by running at 2.2 GHz using 10 W, as an example.

As such, at block 430 this additional power can be allocated to, e.g., one or more CPUs of the SoC based on the updated available power budget. With this additional power increase, such one or more CPUs may operate at a higher frequency and/or higher voltage. Of course in different cases, other components of the SoC may be allocated an increased power budget in this situation. Understand further that if a request is made to power on the shared power rail and one or more of the IP agents, a reallocation of the power budget occurs so that available power budget is present to power the shared power rail and the one or more IP agents. Understand while shown at this high level in the embodiment of FIG. 4, many variations and alternatives are possible.

Figure 5:
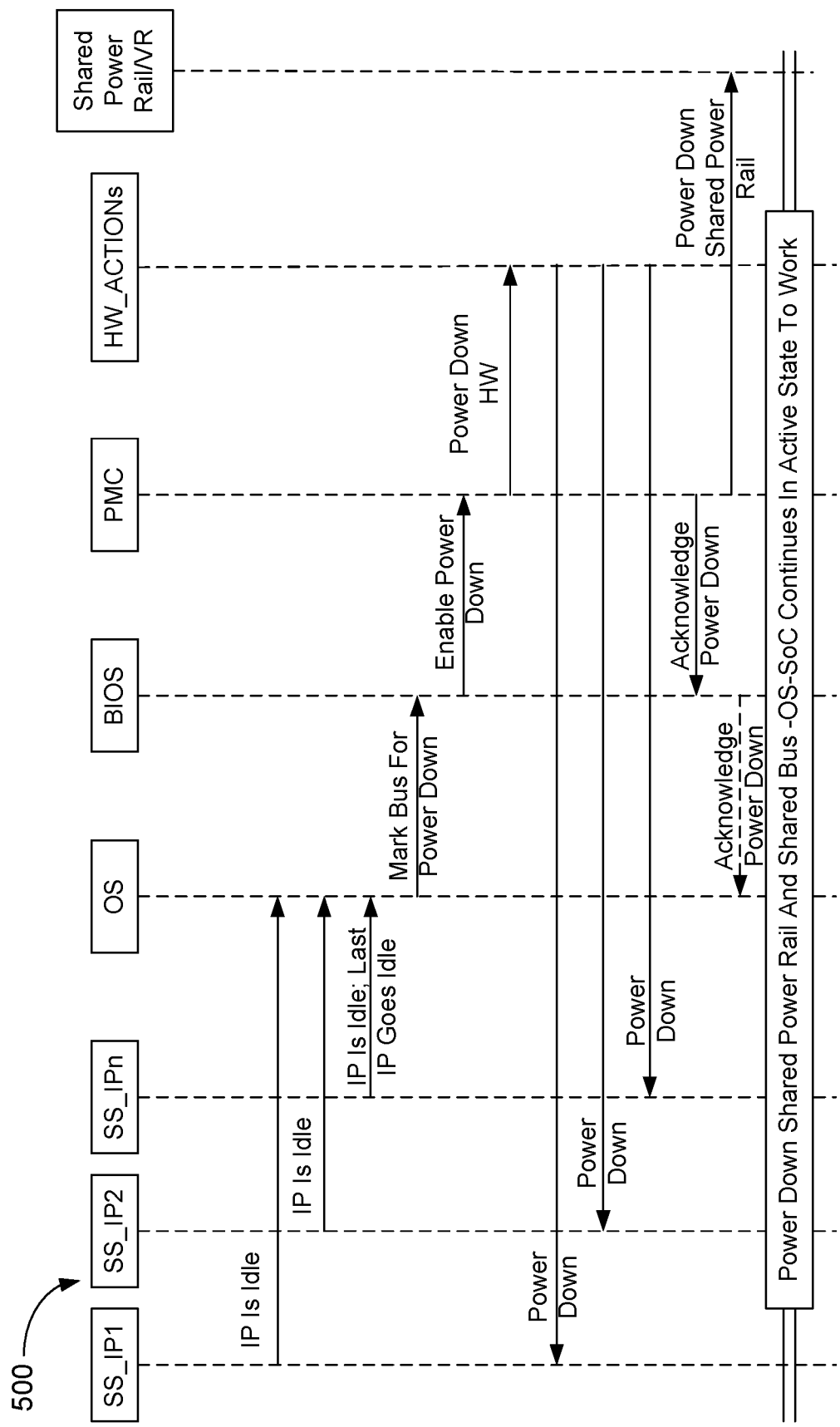
FIG. 5 is a diagram illustrating a power down sequence for a shared power rail in accordance with an embodiment.

Referring now to FIG. 5, shown is a diagram illustrating a power down sequence for a shared power rail in accordance with an embodiment. As shown in FIG. 5, state diagram 500 begins by corresponding IP agents communicating to an OS that they are in an idle state. More specifically, these communications of an idle state may be sent by a driver for the agent (which itself may execute on a general-purpose core).

An OS may next determine that all IP agents on a given shared power rail are in an idle state. This determination may be with reference to a table that identifies that all agents on a common power rail are in an idle power state. As such, the OS may send a power down message to BIOS or other firmware that in turn initiates a power down enable signal to a power management controller (PMC) to cause appropriate hardware to be powered down. In this instance, PMC may send power down messages to the individual IP agents (if they have not already been appropriately powered down) and the shared power rail and/or IVR that provides the operating voltage to the shared power rail. In response to this activity, the PMC may send an acknowledgment message to the BIOS that the shared power rail has been powered down, and in turn the BIOS may optionally acknowledge to the OS that the shared power rail is powered down. At this point a shared bus optionally also may be powered down. Note that in this instance in which all such IP agents on the shared power rail (and shared communication bus) are powered down, remaining portions of the SoC such as one or more CPUs may continue to operate in an active state (and may receive additional power allocations).

Figure 6:
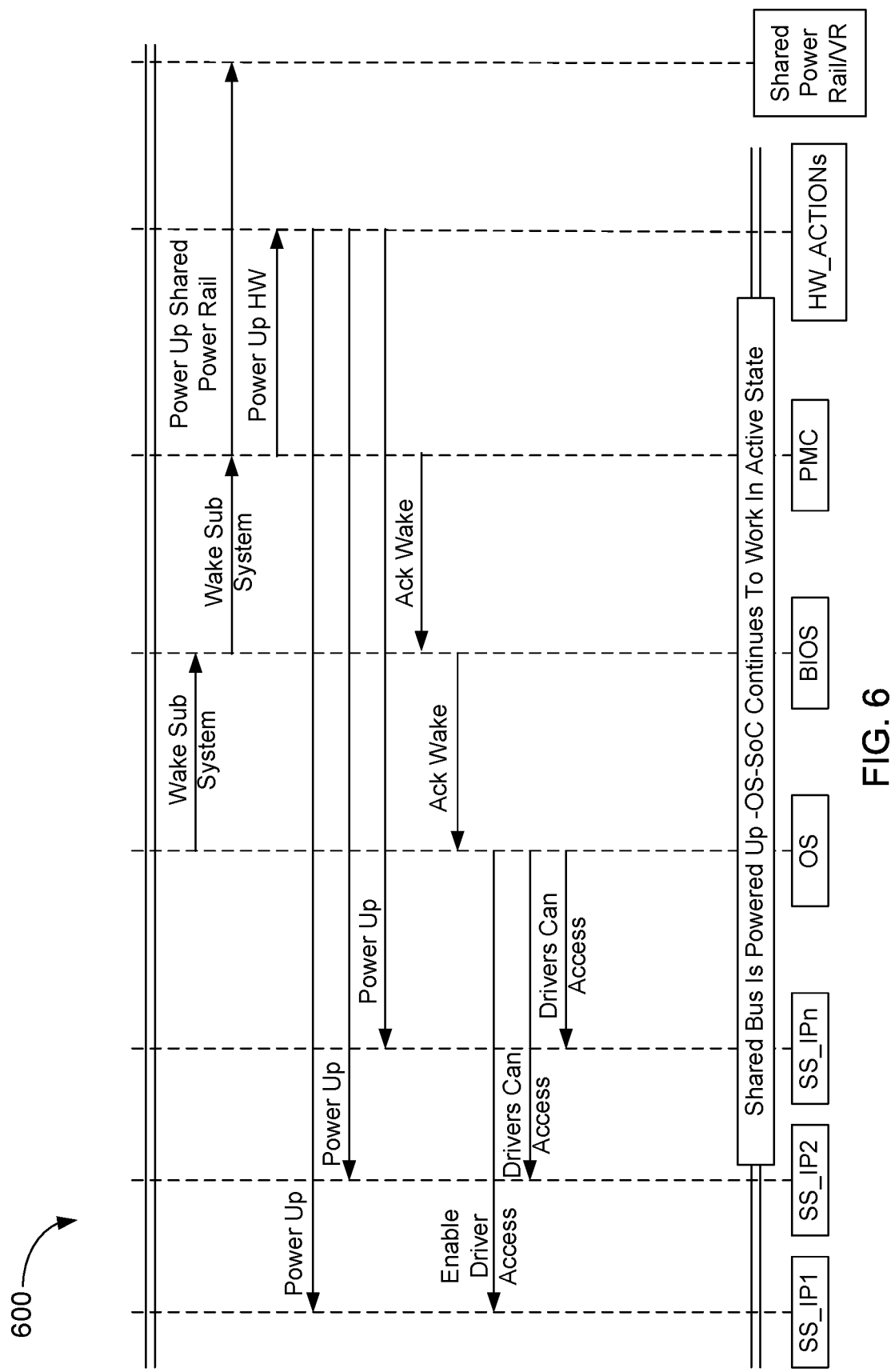
FIG. 6 is a diagram illustrating a power up sequence for a shared power rail in accordance with an embodiment.

Referring now to FIG. 6, shown is a diagram illustrating a power up sequence for a shared power rail in accordance with an embodiment. As shown in FIG. 6, state diagram 600 begins by sending a wake message for a subsystem, namely a shared power rail and one or more IP agents coupled to the shared power rail. In an embodiment, this wake message may be initiated in an OS, e.g., in response to some trigger that the one or more IP agents of the shared power rail are to be powered on to perform some operation. As seen, this communication may be sent to the PMC via BIOS. Next, the PMC may cause various hardware to be powered on. For example, the PMC may cause an IVR and the stored power rail to be powered to provide the operating voltage to one or more IP agents and to thereafter enable the given IP agents themselves to be powered on. When this operation is completed, the PMC may communicate to the OS, via BIOS, an acknowledgment of the power on operation. Thereafter, the OS can enable drivers for the corresponding IP agents to enable access the IP agents. Understand while shown at this high level in the embodiment of FIG. 6, many variations and alternatives are possible.

For example note that the PC or other hardware also may initiate a power up of the shared power rail and one or more IP agents, for example, due to a new device connection or for another reason. Or in the case that one of the IP agents is a USB interface, a user moves a USB-based mouse to take it and the whole system out of idleness. In such cases, the power controller can cause a driver for a newly powered IP agent to be woken via an interrupt to the OS, that in turn triggers the driver.

With embodiments, a large number of IP agents or groups of IP agents can be integrated on an SoC without incurring additional leakage or idle power in a package C0 state when it is determined that all of a group of IP agents coupled to a shared power rail are in an appropriate low power state. Still further, with embodiments a power controller can selectively cause IP agents and an associated shared power rail to be powered down while the SoC is in an active state. Stated another way, the power controller need not wait for a full idle condition of the SoC in which the OS and all other general-purpose processor cores and other processing units become idle before causing this group power down. Instead, the power controller can perform the power down activities described herein when it is determined that all IP agents of a group are idle and the OS indicates that this group of IP agents is in an appropriate idle state (e.g., a given device low power state). In an embodiment, a power controller can gate/power down a group so long as the IP agents of the group are idle and the OS informs the power controller that the agents are in the D3 state, and that the operating system will not allow software to access any of these IP agents until an appropriate low power state exit process has been completed.

In contrast, without an embodiment there may be significantly reduced ability for both IP agents and a shared power rail to enter into low power states as described herein. That is, without an embodiment, if an IP agent is enabled at boot time, software agents can potentially access the IP agents at any time such that the IP agent is not power gated when idle when software/cores are active. Instead with embodiments, techniques are provided to power down a group of IP agents and a shared power rail, while other components such as one or more cores and software are in an active state. Embodiments may be applicable to all platforms (e.g., client/devices/servers), and can enable partially powered SoCs even in a package C0 state when software is running, and re-allocating power budget to parts of SoC that are really doing active work.

Figure 7:
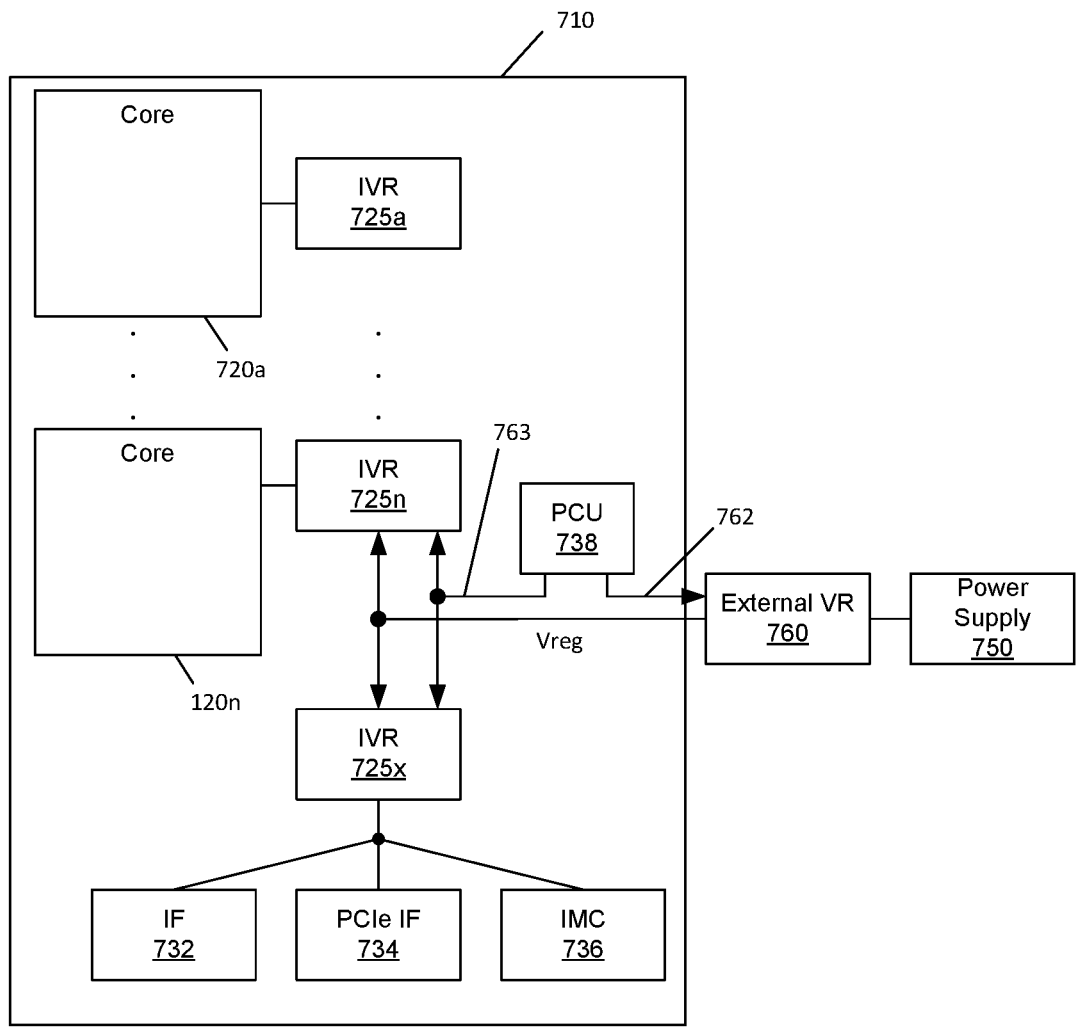
FIG. 7 is a block diagram of a portion of a system in accordance with an embodiment of the present invention.

Embodiments may be used in different system types. Referring now to FIG. 7, shown is a block diagram of a portion of a system in accordance with an embodiment of the present invention. As shown in FIG. 7, system 700 may include various components, including a processor 710 which as shown is a multicore processor. Processor 710 may be coupled to a power supply 750 via an external voltage regulator 760, which may perform a first voltage conversion to provide a primary regulated voltage Vreg to processor 710.

As seen, processor 710 may be a single die processor including multiple cores 720a-720n. In addition, each core may be associated with an IVR 725a-725n which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance. In some embodiments, the use of multiple IVRs enables the grouping of components into separate power planes, such that power is regulated and supplied by the IVR to only those components in the group. During power management, a given power plane of one IVR may be powered down or off when the processor is placed into a certain low power state, while another power plane of another IVR remains active, or fully powered. Similarly, cores 720 may include or be associated with independent clock generation circuitry such as one or more phase lock loops (PLLs) to control operating frequency of each core 720 independently.

Still referring to FIG. 7, additional components may be present within the processor including an input/output interface (IF) 732, another interface 734, and an integrated memory controller (IMC) 736. As seen, each of these components may be powered by another integrated voltage regulator $725_x$. These various components, namely interfaces 732, 734 and IMC 736, couple to IVR $725_x$ via a shared power rail. As such, in instances in which all of these components (and any other IP agents coupled to this shared power rail) are in an idle state, the shared power rail and potentially IVR $725_x$ also may be powered down, reducing power consumption and enabling any associated power budget to be re-allocated, e.g., to cores 720. In one embodiment, interface 732 may enable operation for an Intel® Quick Path Interconnect (QPI) interconnect, which provides for point-to-point (PtP) links in a cache coherent protocol that includes multiple layers including a physical layer, a link layer and a protocol layer. In turn, interface 734 may communicate via a Peripheral Component Interconnect Express (PCIe™) protocol.

Also shown is a power control unit (PCU) 738, which may include circuitry including hardware, software and/or firmware to perform power management operations with regard to processor 710. As seen, PCU 738 provides control information to external voltage regulator 760 via a digital interface 762 to cause the voltage regulator to generate the appropriate regulated voltage. PCU 738 also provides control information to IVRs 725 via another digital interface 763 to control the operating voltage generated (or to cause a corresponding IVR to be disabled in a low power mode). And as described herein, this control may include powering down of both shared power rails and IVRs, when components coupled to such power rails are in an idle state. PCU 738 may further in such instances re-allocate any power budget from these powered down components to other active components, such as cores 720, as described herein. In various embodiments, PCU 738 may include a variety of power management logic units or circuits to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

In FIG. 7, PCU 738 is illustrated as being present as a separate circuit of the processor. In other cases PCU 738 may execute on a given one or more of cores 720. In some cases, PCU 738 may be implemented as a microcontroller (dedicated or general-purpose) or other control logic configured to execute its own dedicated power management code, sometimes referred to as P-code. In yet other embodiments, power management operations to be performed by PCU 738 may be implemented externally to a processor, such as by way of a separate power management integrated circuit (PMIC) or other component external to the processor. In yet other embodiments, power management operations to be performed by PCU 738 may be implemented within BIOS or other system software.

Embodiments may be particularly suitable for a multicore processor in which each of multiple cores can operate at an independent voltage and frequency point. As used herein the term "domain" is used to mean a collection of hardware and/or logic that operates at the same voltage and frequency point. In addition, a multicore processor can further include other non-core processing engines such as fixed function units, graphics engines, and so forth. Such processor can include independent domains other than the cores, such as one or more domains associated with a graphics engine (referred to herein as a graphics domain) and one or more domains associated with non-core circuitry, referred to herein as an uncore or a system agent. Although many implementations of a multi-domain processor can be formed on a single semiconductor die, other implementations can be realized by a multi-chip package in which different domains can be present on different semiconductor die of a single package.

While not shown for ease of illustration, understand that additional components may be present within processor 710 such as additional control circuitry, and other components such as internal memories, e.g., one or more levels of a cache memory hierarchy and so forth. Furthermore, while shown in the implementation of FIG. 7 with an integrated voltage regulator, embodiments are not so limited. For example, other regulated voltages may be provided to on-chip resources from external voltage regulator 760 or one or more additional external sources of regulated voltages.

Note that the power management techniques described herein may be independent of and complementary to an operating system (OS)-based power management (OSPM) mechanism. According to one example OSPM technique, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic, overclocking, or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to one OSPM mechanism, a processor can operate at various power states or levels. With regard to power states, an OSPM mechanism may specify different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Understand that many different types of power management techniques may be used individually or in combination in different embodiments. As representative examples, a power controller may control the processor to be power managed by some form of dynamic voltage frequency scaling (DVFS) in which an operating voltage and/or operating frequency of one or more cores or other processor logic may be dynamically controlled to reduce power consumption in certain situations. In an example, DVFS may be performed using Enhanced Intel SpeedStep™ technology available from Intel Corporation, Santa Clara, Calif., to provide optimal performance at a lowest power consumption level. In another example, DVFS may be performed using Intel TurboBoost™ technology to enable one or more cores or other compute engines to operate at a higher than guaranteed operating frequency based on conditions (e.g., workload and availability).

Another power management technique that may be used in certain examples is dynamic swapping of workloads between different compute engines. For example, the processor may include asymmetric cores or other processing engines that operate at different power consumption levels, such that in a power constrained situation, one or more workloads can be dynamically switched to execute on a lower power core or other compute engine. Another exemplary power management technique is hardware duty cycling (HDC), which may cause cores and/or other compute engines to be periodically enabled and disabled according to a duty cycle, such that one or more cores may be made inactive during an inactive period of the duty cycle and made active during an active period of the duty cycle.

Power management techniques also may be used when constraints exist in an operating environment. For example, when a power and/or thermal constraint is encountered, power may be reduced by reducing operating frequency and/or voltage. Other power management techniques include throttling instruction execution rate or limiting scheduling of instructions. Still further, it is possible for instructions of a given instruction set architecture to include express or implicit direction as to power management operations. Although described with these particular examples, understand that many other power management techniques may be used in particular embodiments.

Figure 8:
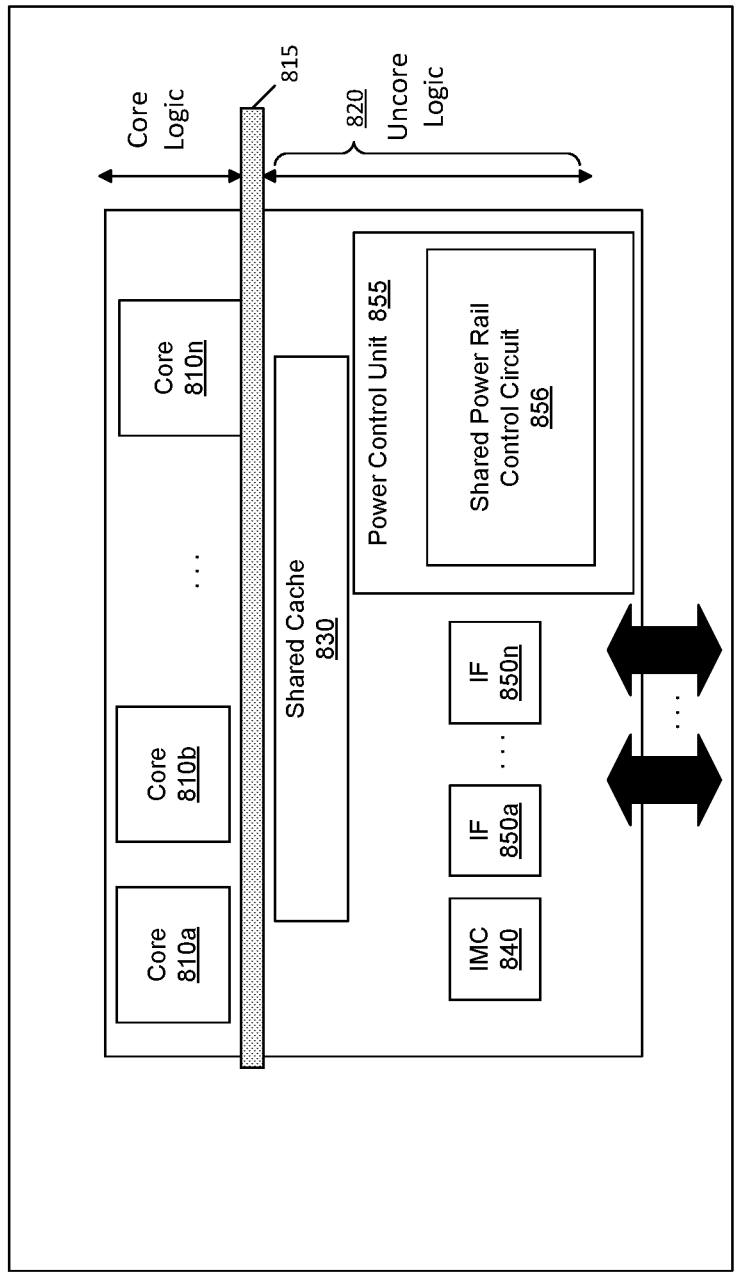
FIG. 8 is a block diagram of a processor in accordance with an embodiment of the present invention.

Embodiments can be implemented in processors for various markets including server processors, desktop processors, mobile processors and so forth. Referring now to FIG. 8, shown is a block diagram of a processor in accordance with an embodiment of the present invention. As shown in FIG. 8, processor 800 may be a multicore processor including a plurality of cores $810_a$-$810_n$. In one embodiment, each such core may be of an independent power domain and can be configured to enter and exit active states and/or maximum performance states based on workload. One or more cores 810 may be heterogeneous to the other cores, e.g., having different micro-architectures, instruction set architectures, pipeline depths, power and performance capabilities. The various cores may be coupled via an interconnect 815 to a system agent 820 that includes various components. As seen, system agent 820 may include a shared cache 830 which may be a last level cache. In addition, the system agent may include an integrated memory controller 840 to communicate with a system memory (not shown in FIG. 8), e.g., via a memory bus. System agent 820 also includes various interfaces 850 and a power control unit 855, which may include logic to perform the power management techniques described herein. To this end, PCU 855 may include a shared power rail control circuit 856, which may cause a shared power rail and associated IVR to be powered down in instances in which all IP agents (such as various non-core circuits) coupled to the shared power rail are to be powered down when inactive.

In addition, by interfaces 850a-850n, connection can be made to various off-chip components such as peripheral devices, mass storage and so forth. While shown with this particular implementation in the embodiment of FIG. 8, the scope of the present invention is not limited in this regard.

Figure 9:
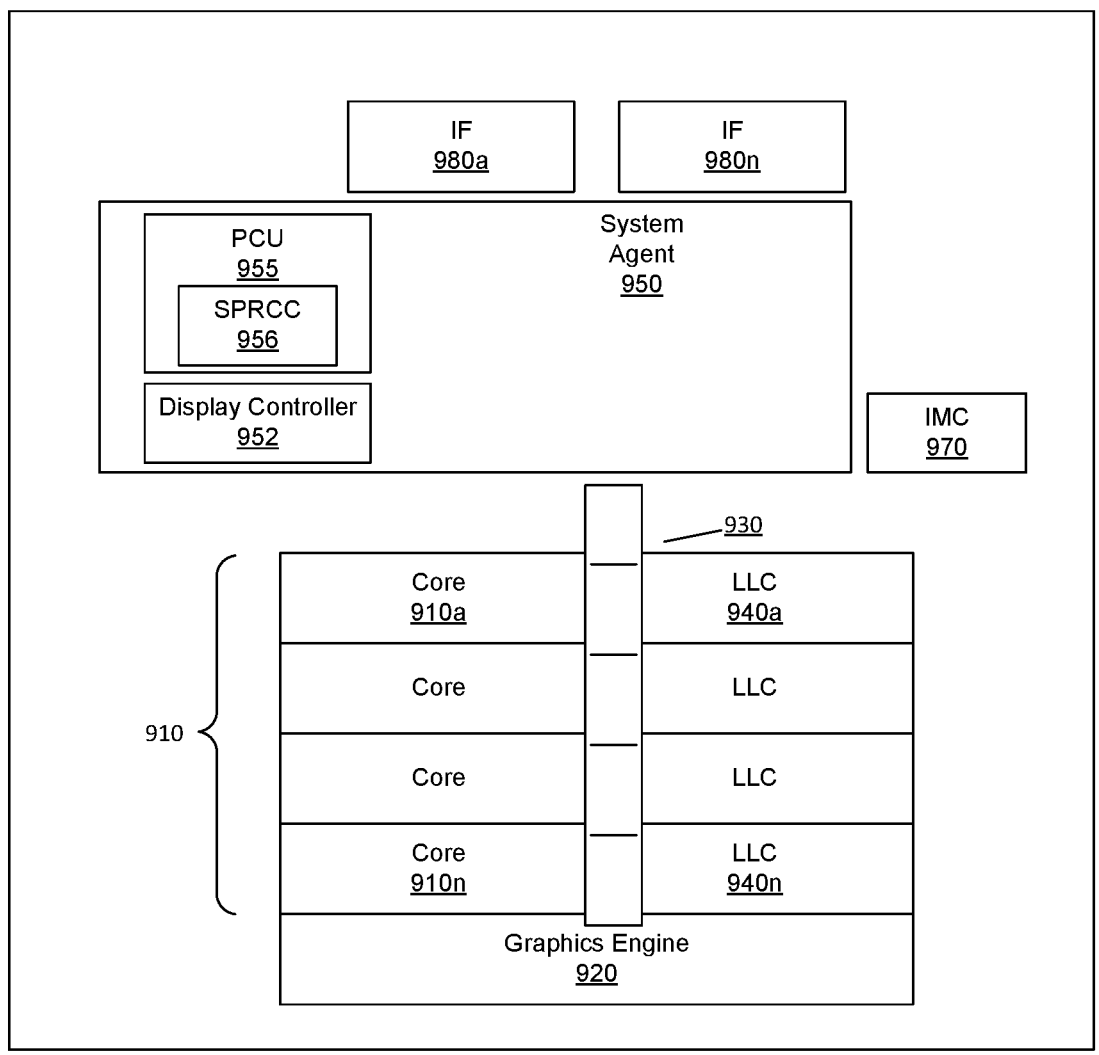
FIG. 9 is a block diagram of a multi-domain processor in accordance with another embodiment of the present invention.

Referring now to FIG. 9, shown is a block diagram of a multi-domain processor in accordance with another embodiment of the present invention. As shown in the embodiment of FIG. 9, processor 900 includes multiple domains. Specifically, a core domain 910 can include a plurality of cores 910a-910n, a graphics domain 920 can include one or more graphics engines, and a system agent domain 950 may further be present. In some embodiments, system agent domain 950 may execute at an independent frequency than the core domain and may remain powered on at all times to handle power control events and power management such that domains 910 and 920 can be controlled to dynamically enter into and exit high power and low power states. Each of domains 910 and 920 may operate at different voltage and/or power. Note that while only shown with three domains, understand the scope of the present invention is not limited in this regard and additional domains can be present in other embodiments. For example, multiple core domains may be present each including at least one core.

In general, each core 910 may further include low level caches in addition to various execution units and additional processing elements. In turn, the various cores may be coupled to each other and to a shared cache memory formed of a plurality of units of a last level cache (LLC) 940a-940n. In various embodiments, LLC 940 may be shared amongst the cores and the graphics engine, as well as various media processing circuitry. As seen, a ring interconnect 930 thus couples the cores together, and provides interconnection between the cores, graphics domain 920 and system agent circuitry 950. In one embodiment, interconnect 930 can be part of the core domain. However in other embodiments the ring interconnect can be of its own domain.

As further seen, system agent domain 950 may include display controller 952 which may provide control of and an interface to an associated display. As further seen, system agent domain 950 may include a power control unit 955 which can include logic to perform the power management techniques described herein. To this end, PCU 955 may include a shared power rail control circuit 956, which may cause a shared power rail and associated IVR to be powered down in instances in which all IP agents coupled to it are to be powered down when inactive.

As further seen in FIG. 9, processor 900 can further include an integrated memory controller (IMC) 970 that can provide for an interface to a system memory, such as a dynamic random access memory (DRAM). Multiple interfaces 980a-980n may be present to enable interconnection between the processor and other circuitry. For example, in one embodiment at least one direct media interface (DMI) interface may be provided as well as one or more PCIe™ interfaces. Still further, to provide for communications between other agents such as additional processors or other circuitry, one or more QPI interfaces may also be provided. Although shown at this high level in the embodiment of FIG. 9, understand the scope of the present invention is not limited in this regard.

Figure 10:
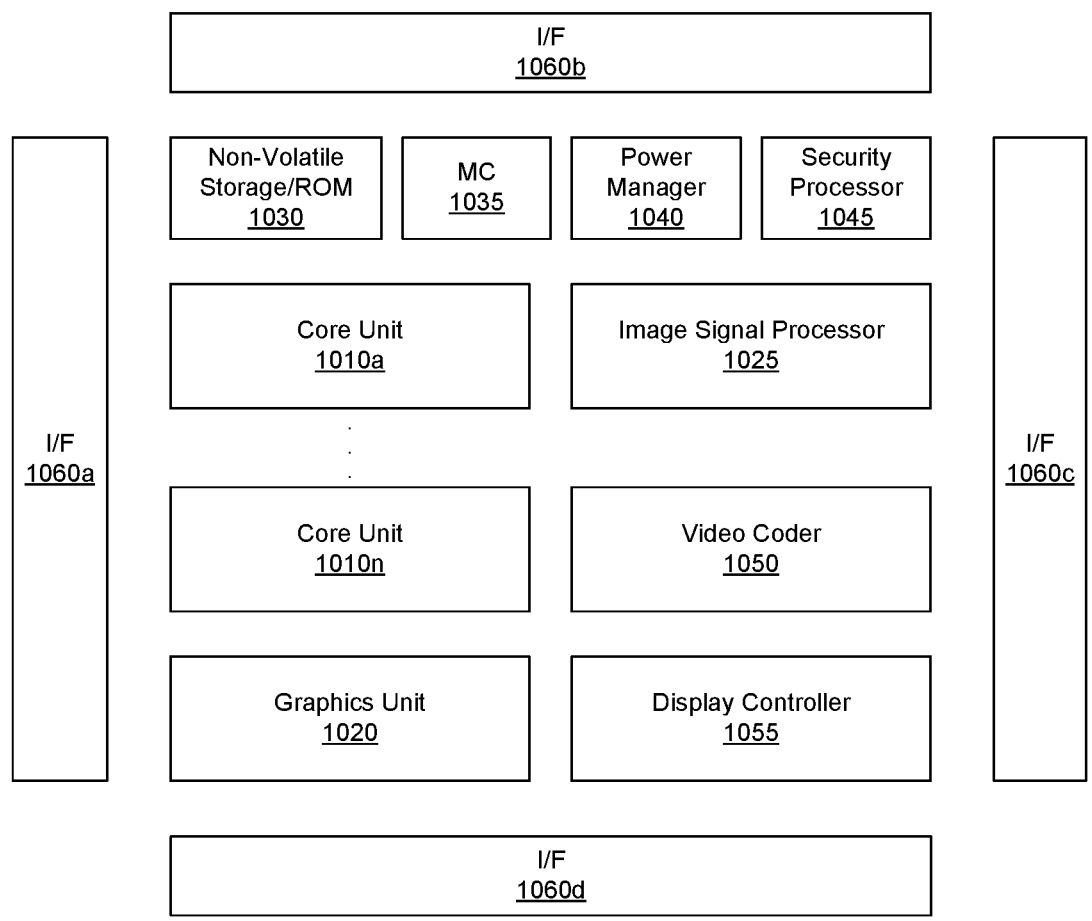
FIG. 10 is a block diagram of a processor in accordance with another embodiment of the present invention.

Referring now to FIG. 10, shown is a block diagram of a processor in accordance with another embodiment of the present invention. In the embodiment of FIG. 10, processor 1000 may be a SoC including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation. However, other low power processors such as available from Advanced Micro Devices, Inc. (AMD) of Sunnyvale, Calif., an ARM-based design from ARM Holdings, Ltd. or licensee thereof or a MIPS-based design from MIPS Technologies, Inc. of Sunnyvale, Calif., or their licensees or adopters may instead be present in other embodiments such as an Apple A7 processor, a Qualcomm Snapdragon processor, or Texas Instruments OMAP processor. Such SoC may be used in a low power system such as a smartphone, tablet computer, phablet computer, Ultrabook™ computer or other portable computing device, which may incorporate a heterogeneous system architecture having a heterogeneous system architecture-based processor design.

In the high level view shown in FIG. 10, processor 1000 includes a plurality of core units 1010a-1010n. Each core unit may include one or more processor cores, one or more cache memories and other circuitry. Each core unit 1010 may support one or more instruction sets (e.g., an x86 instruction set (with some extensions that have been added with newer versions); a MIPS instruction set; an ARM instruction set (with optional additional extensions such as NEON)) or other instruction set or combinations thereof. Note that some of the core units may be heterogeneous resources (e.g., of a different design). In addition, each such core may be coupled to a cache memory (not shown) which in an embodiment may be a shared level two (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a DRAM (not shown for ease of illustration in FIG. 10).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip.

Other accelerators also may be present. In the illustration of FIG. 10, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040, which may include control logic to perform the various power management techniques described herein. To this end, power manager 1040 may include control circuitry to enable a shared power rail and components coupled thereto to be powered down in instances in which all components coupled to that shared power rail are in an idle or other low power state. Power manager 1040 may further in this instance re-allocate available power budget for these components to other components within SoC 1000, including core units 1010 and/or graphics unit 1020.

In some embodiments, SoC 1000 may further include a non-coherent fabric coupled to the coherent fabric to which various peripheral devices may couple. One or more interfaces 1060a-1060d enable communication with one or more off-chip devices. Such communications may be via a variety of communication protocols such as PCIe™, GPIO, USB, I²C, UART, MIPI, SDIO, DDR, SPI, HDMI, among other types of communication protocols. Although shown at this high level in the embodiment of FIG. 10, understand the scope of the present invention is not limited in this regard.

Figure 11:
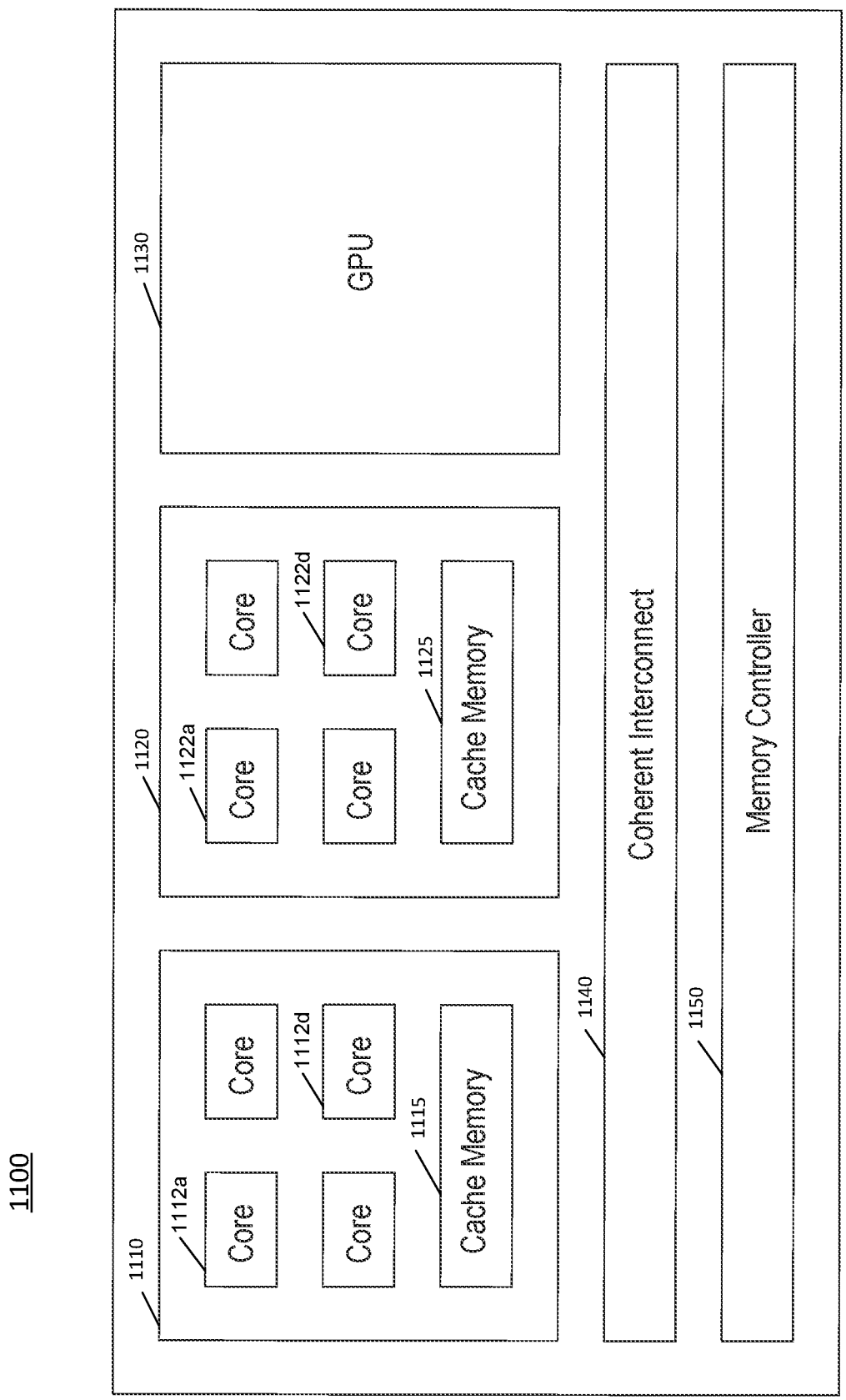
FIG. 11 is a block diagram of a representative SoC in accordance with an embodiment of the present invention.

Referring now to FIG. 11, shown is a block diagram of a representative SoC. In the embodiment shown, SoC 1100 may be a multi-core SoC configured for low power operation to be optimized for incorporation into a smartphone or other low power device such as a tablet computer or other portable computing device. As an example, SoC 1100 may be implemented using asymmetric or different types of cores, such as combinations of higher power and/or low power cores, e.g., out-of-order cores and in-order cores. In different embodiments, these cores may be based on an Intel® Architecture™ core design or an ARM architecture design. In yet other embodiments, a mix of Intel and ARM cores may be implemented in a given SoC.

As seen in FIG. 11, SoC 1100 includes a first core domain 1110 having a plurality of first cores 1112a-1112d. In an example, these cores may be low power cores such as in-order cores. In one embodiment these first cores may be implemented as ARM Cortex A53 cores. In turn, these cores couple to a cache memory 1115 of core domain 1110. In addition, SoC 1100 includes a second core domain 1120. In the illustration of FIG. 11, second core domain 1120 has a plurality of second cores 1122a-1122d. In an example, these cores may be higher power-consuming cores than first cores 1112. In an embodiment, the second cores may be out-of-order cores, which may be implemented as ARM Cortex A57 cores. In turn, these cores couple to a cache memory 1125 of core domain 1120. Note that while the example shown in FIG. 11 includes 4 cores in each domain, understand that more or fewer cores may be present in a given domain in other examples.

With further reference to FIG. 11, a graphics domain 1130 also is provided, which may include one or more graphics processing units (GPUs) configured to independently execute graphics workloads, e.g., provided by one or more cores of core domains 1110 and 1120. As an example, GPU domain 1130 may be used to provide display support for a variety of screen sizes, in addition to providing graphics and display rendering operations.

As seen, the various domains couple to a coherent interconnect 1140, which in an embodiment may be a cache coherent interconnect fabric that in turn couples to an integrated memory controller 1150. Coherent interconnect 1140 may include a shared cache memory, such as an L3 cache, in some examples. In an embodiment, memory controller 1150 may be a direct memory controller to provide for multiple channels of communication with an off-chip memory, such as multiple channels of a DRAM (not shown for ease of illustration in FIG. 11).

In different examples, the number of the core domains may vary. For example, for a low power SoC suitable for incorporation into a mobile computing device, a limited number of core domains such as shown in FIG. 11 may be present. Still further, in such low power SoCs, core domain 1120 including higher power cores may have fewer numbers of such cores. For example, in one implementation two cores 1122 may be provided to enable operation at reduced power consumption levels. In addition, the different core domains may also be coupled to an interrupt controller to enable dynamic swapping of workloads between the different domains.

In yet other embodiments, a greater number of core domains, as well as additional optional IP logic may be present, in that an SoC can be scaled to higher performance (and power) levels for incorporation into other computing devices, such as desktops, servers, high performance computing systems, base stations forth. As one such example, 4 core domains each having a given number of out-of-order cores may be provided. Still further, in addition to optional GPU support (which as an example may take the form of a GPGPU), one or more accelerators to provide optimized hardware support for particular functions (e.g. web serving, network processing, switching or so forth) also may be provided. In addition, an input/output interface may be present to couple such accelerators to off-chip components.

Figure 12:
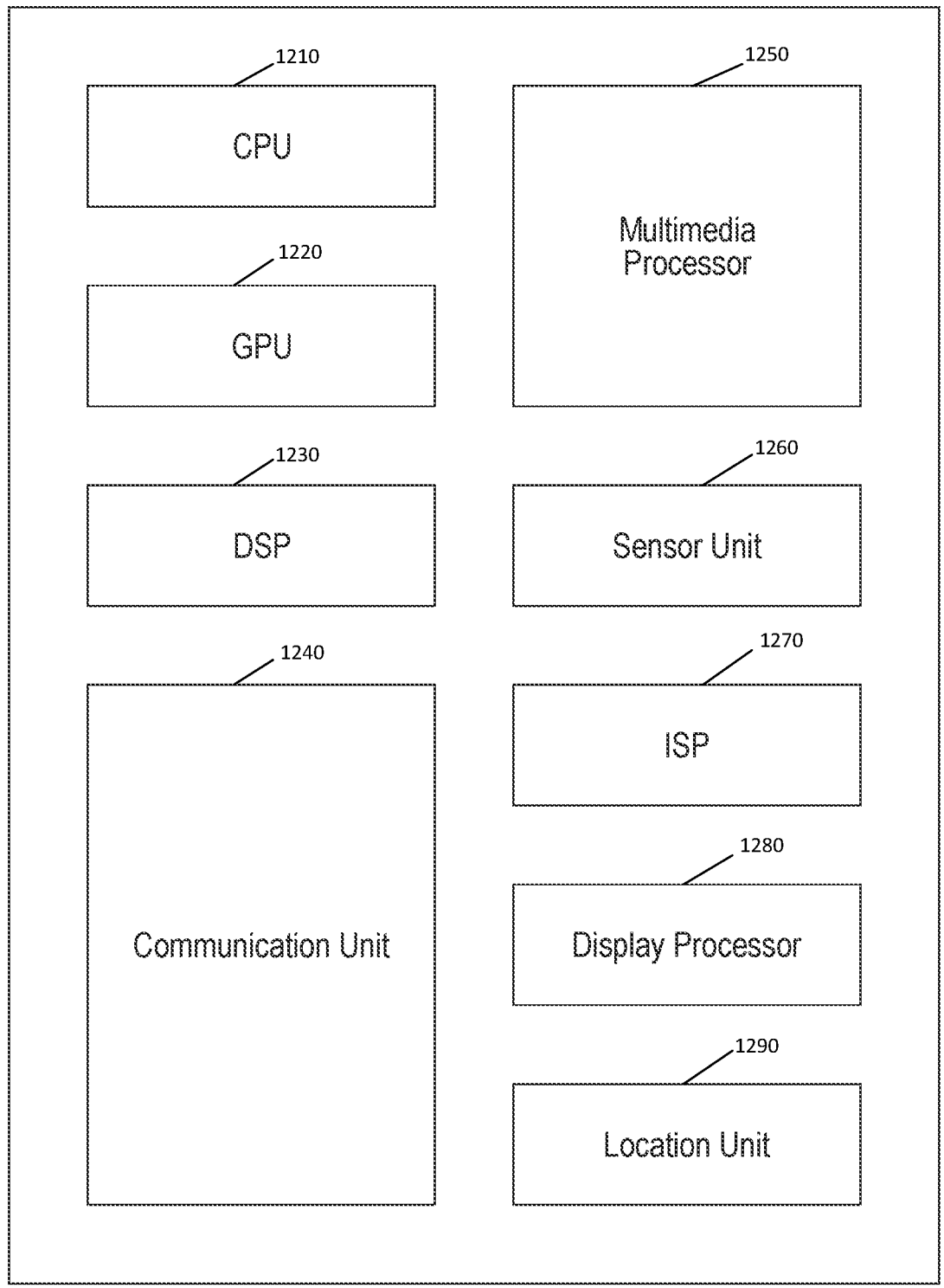
FIG. 12 is a block diagram of another example SoC in accordance with an embodiment of the present invention.

Referring now to FIG. 12, shown is a block diagram of another example SoC. In the embodiment of FIG. 12, SoC 1200 may include various circuitry to enable high performance for multimedia applications, communications and other functions. As such, SoC 1200 is suitable for incorporation into a wide variety of portable and other devices, such as smartphones, tablet computers, smart TVs and so forth. In the example shown, SoC 1200 includes a central processor unit (CPU) domain 1210. In an embodiment, a plurality of individual processor cores may be present in CPU domain 1210. As one example, CPU domain 1210 may be a quad core processor having 4 multithreaded cores. Such processors may be homogeneous or heterogeneous processors, e.g., a mix of low power and high power processor cores.

In turn, a GPU domain 1220 is provided to perform advanced graphics processing in one or more GPUs to handle graphics and compute APIs. A DSP unit 1230 may provide one or more low power DSPs for handling low-power multimedia applications such as music playback, audio/video and so forth, in addition to advanced calculations that may occur during execution of multimedia instructions. In turn, a communication unit 1240 may include various components to provide connectivity via various wireless protocols, such as cellular communications (including 3G/4G LTE), wireless local area protocols such as Bluetooth™, IEEE 802.11, and so forth.

Still further, a multimedia processor 1250 may be used to perform capture and playback of high definition video and audio content, including processing of user gestures. A sensor unit 1260 may include a plurality of sensors and/or a sensor controller to interface to various off-chip sensors present in a given platform. An image signal processor 1270 may be provided with one or more separate ISPs to perform image processing with regard to captured content from one or more cameras of a platform, including still and video cameras.

A display processor 1280 may provide support for connection to a high definition display of a given pixel density, including the ability to wirelessly communicate content for playback on such display. Still further, a location unit 1290 may include a GPS receiver with support for multiple GPS constellations to provide applications highly accurate positioning information obtained using as such GPS receiver. Understand that while shown with this particular set of components in the example of FIG. 12, many variations and alternatives are possible.

Figure 13:
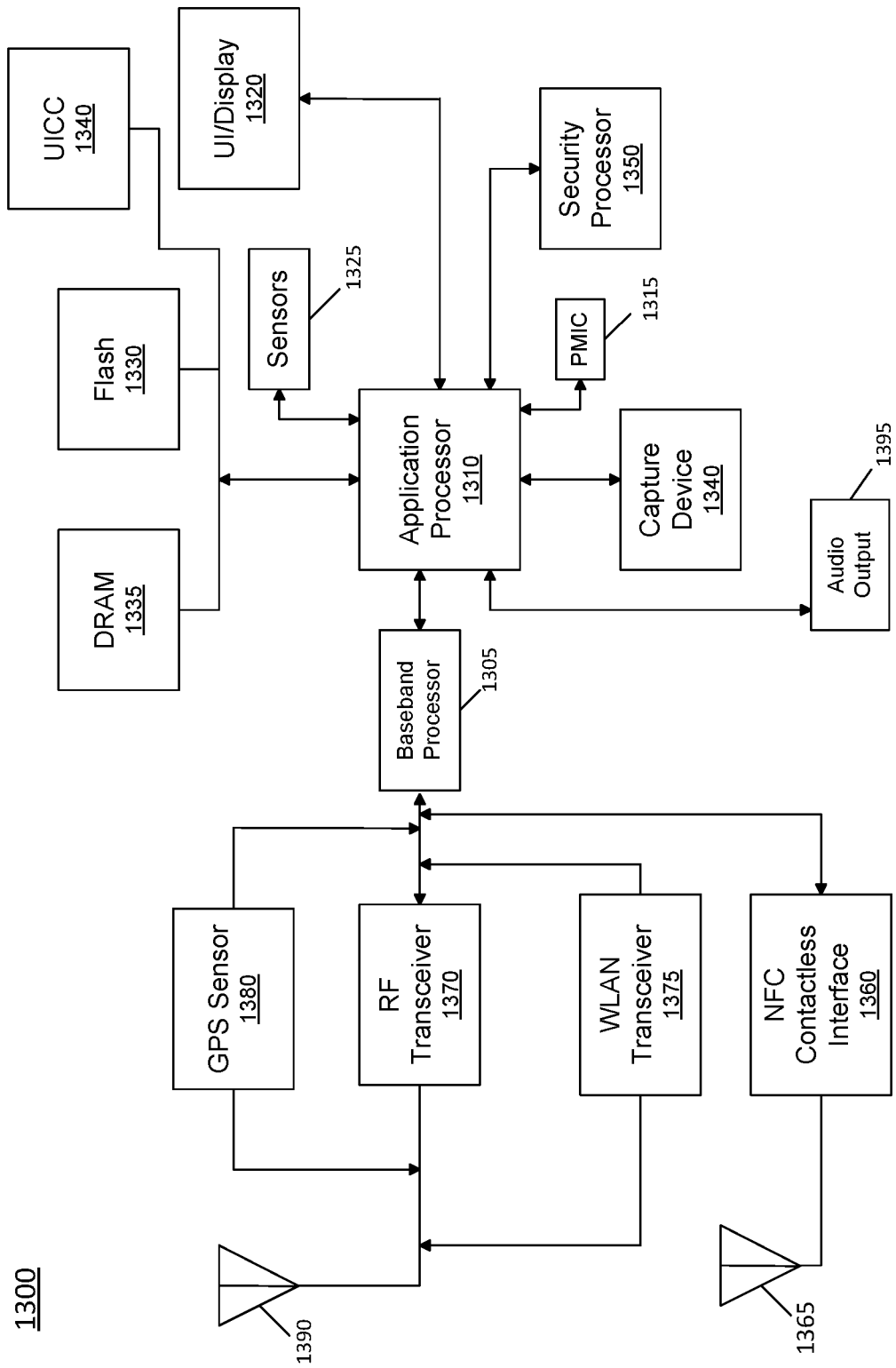
FIG. 13 is a block diagram of an example system with which embodiments can be used.

Referring now to FIG. 13, shown is a block diagram of an example system with which embodiments can be used. As seen, system 1300 may be a smartphone or other wireless communicator. A baseband processor 1305 is configured to perform various signal processing with regard to communication signals to be transmitted from or received by the system. In turn, baseband processor 1305 is coupled to an application processor 1310, which may be a main CPU of the system to execute an OS and other system software, in addition to user applications such as many well-known social media and multimedia apps. Application processor 1310 may further be configured to perform a variety of other computing operations for the device.

In turn, application processor 1310 can couple to a user interface/display 1320, e.g., a touch screen display. In addition, application processor 1310 may couple to a memory system including a non-volatile memory, namely a flash memory 1330 and a system memory, namely a dynamic random access memory (DRAM) 1335. As further seen, application processor 1310 further couples to a capture device 1340 such as one or more image capture devices that can record video and/or still images.

Still referring to FIG. 13, a universal integrated circuit card (UICC) 1340 comprising a subscriber identity module and possibly a secure storage and cryptoprocessor is also coupled to application processor 1310. System 1300 may further include a security processor 1350 that may couple to application processor 1310. A plurality of sensors 1325 may couple to application processor 1310 to enable input of a variety of sensed information such as accelerometer and other environmental information. An audio output device 1395 may provide an interface to output sound, e.g., in the form of voice communications, played or streaming audio data and so forth.

As further illustrated, a near field communication (NFC) contactless interface 1360 is provided that communicates in a NFC near field via an NFC antenna 1365. While separate antennae are shown in FIG. 13, understand that in some implementations one antenna or a different set of antennae may be provided to enable various wireless functionality.

A power management integrated circuit (PMIC) 1315 couples to application processor 1310 to perform platform level power management. To this end, PMIC 1315 may issue power management requests to application processor 1310 to enter certain low power states as desired. Furthermore, based on platform constraints, PMIC 1315 may also control the power level of other components of system 1300.

To enable communications to be transmitted and received, various circuitry may be coupled between baseband processor 1305 and an antenna 1390. Specifically, a radio frequency (RF) transceiver 1370 and a wireless local area network (WLAN) transceiver 1375 may be present. In general, RF transceiver 1370 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 1380 may be present. Other wireless communications such as receipt or transmission of radio signals, e.g., AM/FM and other signals may also be provided. In addition, via WLAN transceiver 1375, local wireless communications can also be realized.

Figure 14:
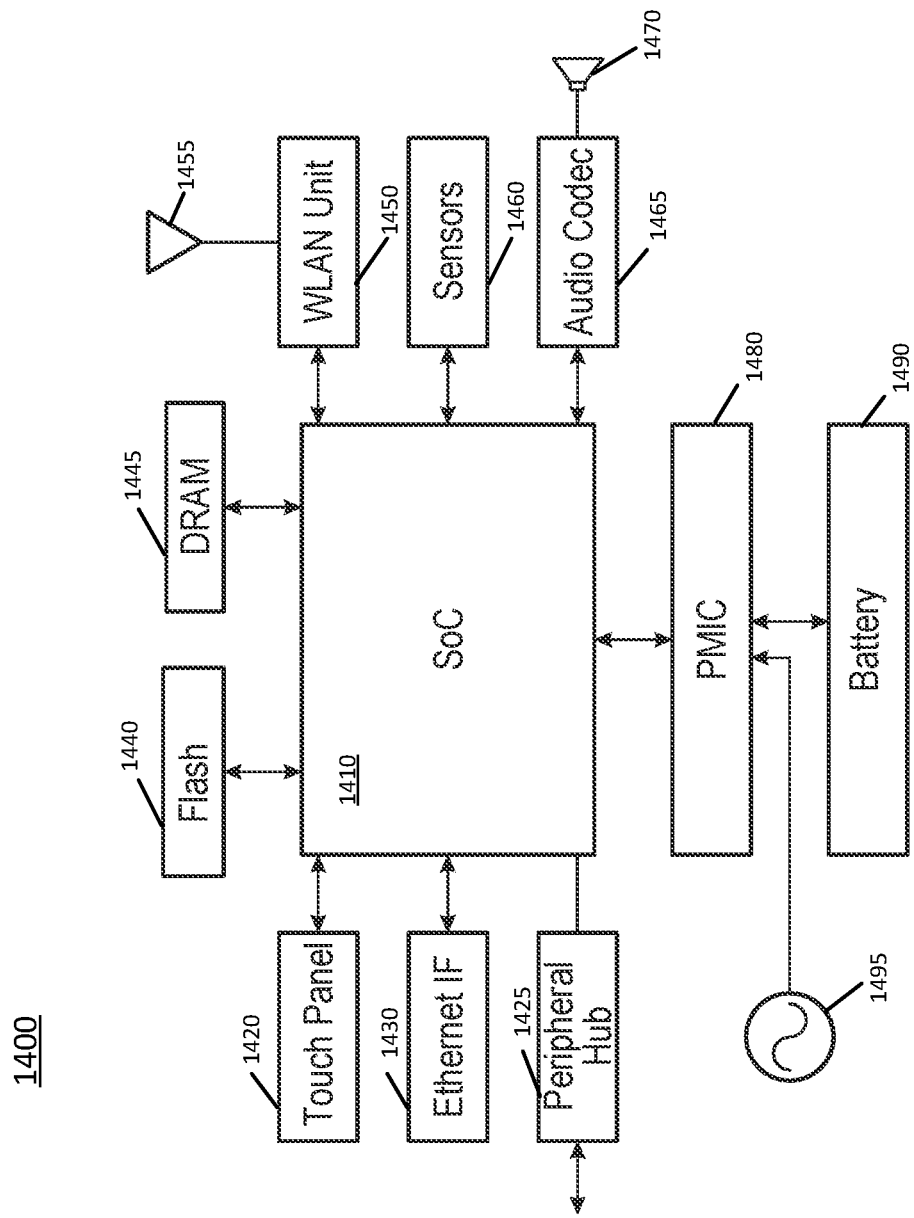
FIG. 14 is a block diagram of another example system with which embodiments may be used.

Referring now to FIG. 14, shown is a block diagram of another example system with which embodiments may be used. In the illustration of FIG. 14, system 1400 may be a mobile low-power system such as a tablet computer, 2:1 tablet, phablet or other convertible or standalone tablet system. As illustrated, a SoC 1410 is present and may be configured to operate as an application processor for the device.

A variety of devices may couple to SoC 1410. In the illustration shown, a memory subsystem includes a flash memory 1440 and a DRAM 1445 coupled to SoC 1410. In addition, a touch panel 1420 is coupled to the SoC 1410 to provide display capability and user input via touch, including provision of a virtual keyboard on a display of touch panel 1420. To provide wired network connectivity, SoC 1410 couples to an Ethernet interface 1430. A peripheral hub 1425 is coupled to SoC 1410 to enable interfacing with various peripheral devices, such as may be coupled to system 1400 by any of various ports or other connectors.

In addition to internal power management circuitry and functionality within SoC 1410, a PMIC 1480 is coupled to SoC 1410 to provide platform-based power management, e.g., based on whether the system is powered by a battery 1490 or AC power via an AC adapter 1495. In addition to this power source-based power management, PMIC 1480 may further perform platform power management activities based on environmental and usage conditions. Still further, PMIC 1480 may communicate control and status information to SoC 1410 to cause various power management actions within SoC 1410.

Still referring to FIG. 14, to provide for wireless capabilities, a WLAN unit 1450 is coupled to SoC 1410 and in turn to an antenna 1455. In various implementations, WLAN unit 1450 may provide for communication according to one or more wireless protocols.

As further illustrated, a plurality of sensors 1460 may couple to SoC 1410. These sensors may include various accelerometer, environmental and other sensors, including user gesture sensors. Finally, an audio codec 1465 is coupled to SoC 1410 to provide an interface to an audio output device 1470. Of course understand that while shown with this particular implementation in FIG. 14, many variations and alternatives are possible.

Figure 15:
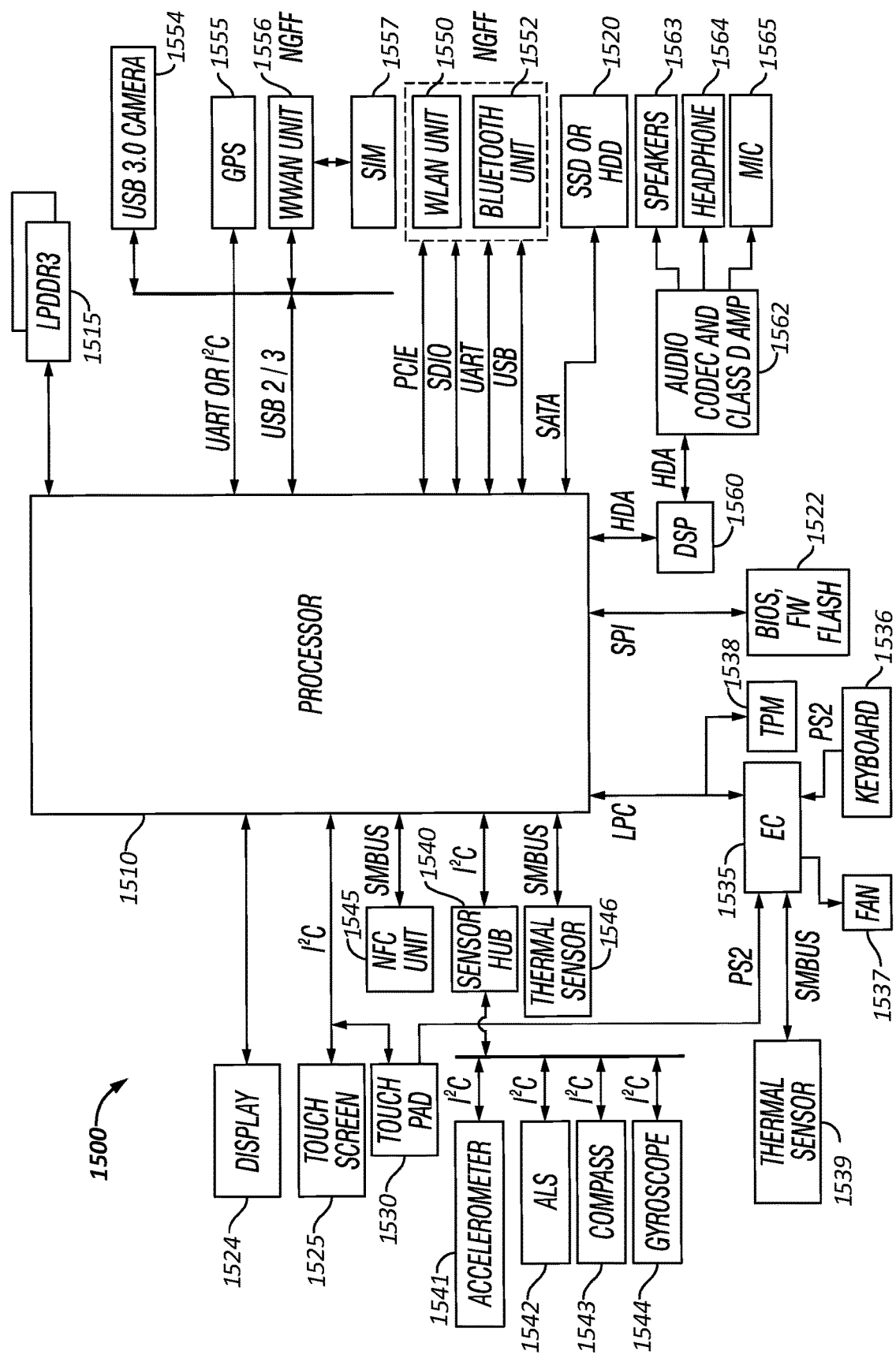
FIG. 15 is a block diagram of a representative computer system.

Referring now to FIG. 15, shown is a block diagram of a representative computer system such as notebook, Ultrabook™ or other small form factor system. A processor 1510, in one embodiment, includes a microprocessor, multi-core processor, multithreaded processor, an ultra low voltage processor, an embedded processor, or other known processing element. In the illustrated implementation, processor 1510 acts as a main processing unit and central hub for communication with many of the various components of the system 1500, and may include power management circuitry as described herein. As one example, processor 1510 is implemented as a SoC.

Processor 1510, in one embodiment, communicates with a system memory 1515. As an illustrative example, the system memory 1515 is implemented via multiple memory devices or modules to provide for a given amount of system memory.

To provide for persistent storage of information such as data, applications, one or more operating systems and so forth, a mass storage 1520 may also couple to processor 1510. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 15, a flash device 1522 may be coupled to processor 1510, e.g., via a serial peripheral interface (SPI). This flash device may provide for non-volatile storage of system software, including a BIOS, which may provide a definition of a shared power rail and its attached IP: agents. Flash device 1522 may further store other firmware of the system.

Various input/output (I/O) devices may be present within system 1500. Specifically shown in the embodiment of FIG. 15 is a display 1524 which may be a high definition LCD or LED panel that further provides for a touch screen 1525. In one embodiment, display 1524 may be coupled to processor 1510 via a display interconnect that can be implemented as a high performance graphics interconnect. Touch screen 1525 may be coupled to processor 1510 via another interconnect, which in an embodiment can be an I²C interconnect. As further shown in FIG. 15, in addition to touch screen 1525, user input by way of touch can also occur via a touch pad 1530 which may be configured within the chassis and may also be coupled to the same I²C interconnect as touch screen 1525.

For perceptual computing and other purposes, various sensors may be present within the system and may be coupled to processor 1510 in different manners. Certain inertial and environmental sensors may couple to processor 1510 through a sensor hub 1540, e.g., via an I²C interconnect. In the embodiment shown in FIG. 15, these sensors may include an accelerometer 1541, an ambient light sensor (ALS) 1542, a compass 1543 and a gyroscope 1544. Other environmental sensors may include one or more thermal sensors 1546 which in some embodiments couple to processor 1510 via a system management bus (SMBus) bus.

Also seen in FIG. 15, various peripheral devices may couple to processor 1510 via a low pin count (LPC) interconnect. In the embodiment shown, various components can be coupled through an embedded controller 1535. Such components can include a keyboard 1536 (e.g., coupled via a PS2 interface), a fan 1537, and a thermal sensor 1539. In some embodiments, touch pad 1530 may also couple to EC 1535 via a PS2 interface. In addition, a security processor such as a trusted platform module (TPM) 1538 may also couple to processor 1510 via this LPC interconnect.

System 1500 can communicate with external devices in a variety of manners, including wirelessly. In the embodiment shown in FIG. 15, various wireless modules, each of which can correspond to a radio configured for a particular wireless communication protocol, are present. One manner for wireless communication in a short range such as a near field may be via a NFC unit 1545 which may communicate, in one embodiment with processor 1510 via an SMBus. Note that via this NFC unit 1545, devices in close proximity to each other can communicate.

As further seen in FIG. 15, additional wireless units can include other short range wireless engines including a WLAN unit 1550 and a Bluetooth™ unit 1552. Using WLAN unit 1550, Wi-Fi™ communications can be realized, while via Bluetooth™ unit 1552, short range Bluetooth™ communications can occur. These units may communicate with processor 1510 via a given link.

In addition, wireless wide area communications, e.g., according to a cellular or other wireless wide area protocol, can occur via a WWAN unit 1556 which in turn may couple to a subscriber identity module (SIM) 1557. In addition, to enable receipt and use of location information, a GPS module 1555 may also be present. Note that in the embodiment shown in FIG. 15, WWAN unit 1556 and an integrated capture device such as a camera module 1554 may communicate via a given link.

To provide for audio inputs and outputs, an audio processor can be implemented via a digital signal processor (DSP) 1560, which may couple to processor 1510 via a high definition audio (HDA) link. Similarly, DSP 1560 may communicate with an integrated coder/decoder (CODEC) and amplifier 1562 that in turn may couple to output speakers 1563 which may be implemented within the chassis. Similarly, amplifier and CODEC 1562 can be coupled to receive audio inputs from a microphone 1565 which in an embodiment can be implemented via dual array microphones (such as a digital microphone array) to provide for high quality audio inputs to enable voice-activated control of various operations within the system. Note also that audio outputs can be provided from amplifier/CODEC 1562 to a headphone jack 1564. Although shown with these particular components in the embodiment of FIG. 15, understand the scope of the present invention is not limited in this regard.

Figure 16:
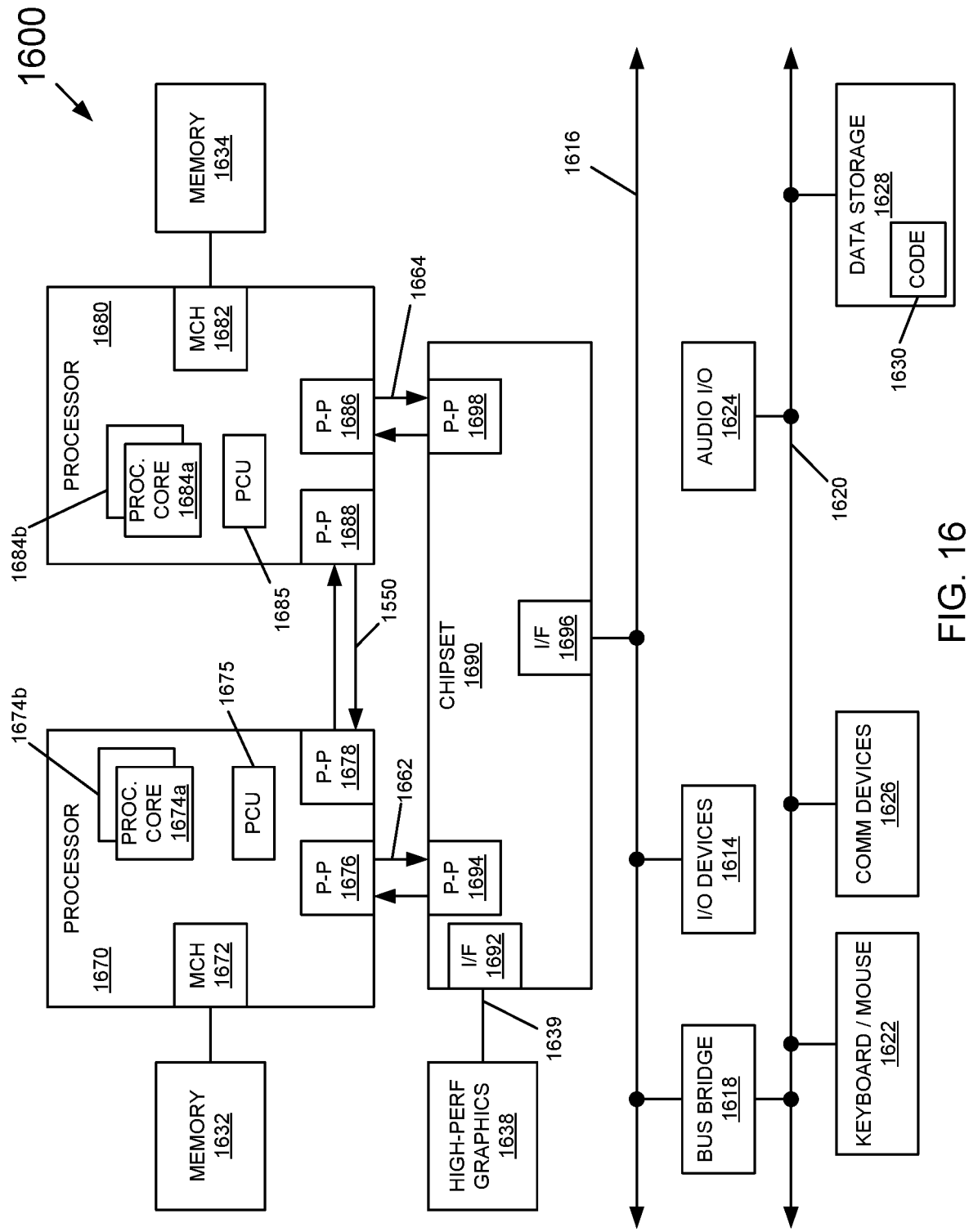
FIG. 16 is a block diagram of a system in accordance with an embodiment of the present invention.

Embodiments may be implemented in many different system types. Referring now to FIG. 16, shown is a block diagram of a system in accordance with an embodiment of the present invention. As shown in FIG. 16, multiprocessor system 1600 is a point-to-point interconnect system, and includes a first processor 1670 and a second processor 1680 coupled via a point-to-point interconnect 1650. As shown in FIG. 16, each of processors 1670 and 1680 may be multicore processors, including first and second processor cores (i.e., processor cores 1674*a* and 1674*b* and processor cores 1684*a* and 1684*b*), although potentially many more cores may be present in the processors. Each of the processors can include a PCU (1675, 1685) or other power management logic to perform processor-based power management as described herein.

Still referring to FIG. 16, first processor 1670 further includes a memory controller hub (MCH) 1672 and point-to-point (P-P) interfaces 1676 and 1678. Similarly, second processor 1680 includes a MCH 1682 and P-P interfaces 1686 and 1688. As shown in FIG. 16, MCH's 1672 and 1682 couple the processors to respective memories, namely a memory 1632 and a memory 1634, which may be portions of system memory (e.g., DRAM) locally attached to the respective processors. First processor 1670 and second processor 1680 may be coupled to a chipset 1690 via P-P interconnects 1662 and 1664, respectively. As shown in FIG. 16, chipset 1690 includes P-P interfaces 1694 and 1698.

Furthermore, chipset 1690 includes an interface 1692 to couple chipset 1690 with a high performance graphics engine 1638, by a P-P interconnect 1639. In turn, chipset 1690 may be coupled to a first bus 1616 via an interface 1696. As shown in FIG. 16, various input/output (I/O) devices 1614 may be coupled to first bus 1616, along with a bus bridge 1618 which couples first bus 1616 to a second bus 1620. Various devices may be coupled to second bus 1620 including, for example, a keyboard/mouse 1622, communication devices 1626 and a data storage unit 1628 such as a disk drive or other mass storage device which may include code 1630, in one embodiment. Further, an audio I/O 1624 may be coupled to second bus 1620. Embodiments can be incorporated into other types of systems including mobile devices such as a smart cellular telephone, tablet computer, netbook, Ultrabook™, or so forth.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 17:
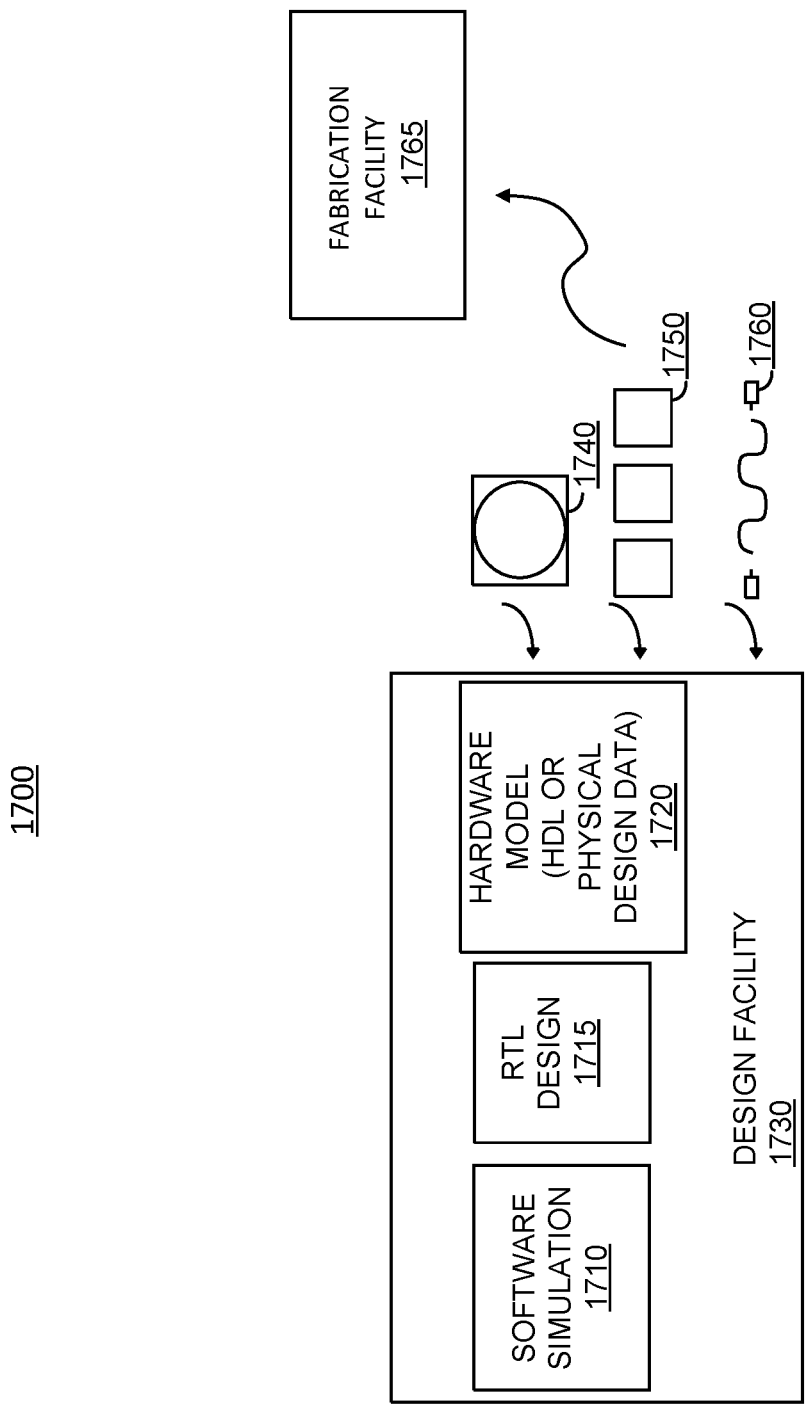
FIG. 17 is a block diagram illustrating an IP core development system used to manufacture an integrated circuit to perform operations according to an embodiment.

FIG. 17 is a block diagram illustrating an IP core development system 1700 that may be used to manufacture an integrated circuit to perform operations according to an embodiment. The IP core development system 1700 may be used to generate modular, reusable designs that can be incorporated into a larger design or used to construct an entire integrated circuit (e.g., an SoC integrated circuit). A design facility 1730 can generate a software simulation 1710 of an IP core design in a high level programming language (e.g., C/C++). The software simulation 1710 can be used to design, test, and verify the behavior of the IP core. A register transfer level (RTL) design can then be created or synthesized from the simulation model. The RTL design 1715 is an abstraction of the behavior of the integrated circuit that models the flow of digital signals between hardware registers, including the associated logic performed using the modeled digital signals. In addition to an RTL design 1715, lower-level designs at the logic level or transistor level may also be created, designed, or synthesized. Thus, the particular details of the initial design and simulation may vary.

The RTL design 1715 or equivalent may be further synthesized by the design facility into a hardware model 1720, which may be in a hardware description language (HDL), or some other representation of physical design data. The HDL may be further simulated or tested to verify the IP core design. The IP core design can be stored for delivery to a third party fabrication facility 1765 using non-volatile memory 1740 (e.g., hard disk, flash memory, or any non-volatile storage medium). Alternately, the IP core design may be transmitted (e.g., via the Internet) over a wired connection 1750 or wireless connection 1760. The fabrication facility 1765 may then fabricate an integrated circuit that is based at least in part on the IP core design. The fabricated integrated circuit can be configured to perform operations in accordance with at least one embodiment described herein.

The following examples pertain to further embodiments.

In one example, a SoC comprises: at least one core; a plurality of IP agents coupled to the at least one core; a shared power rail to provide an operating voltage to the plurality of IP agents; and a power controller, in response to an indication that the plurality of IP agents are in an idle state and the at least one core is in an active state, to power down the shared power rail while the at least one core remains in the active state.

In an example, a first software agent is to inform an OS that a first IP agent is to enter into the idle state, the OS to maintain a table including a plurality of entries, each associated with one of the plurality of IP agents.

In an example, the OS is to update a first entry of the table to indicate that the first IP agent is to be in the idle state.

In an example, the power controller is to receive a power down message from the OS in response to a determination that at least one of the plurality of IP agents has entered the idle state, the power down message comprising the indication.

In an example, the power controller, in response to a request to power on the first IP agent, is to power on the shared power rail, thereafter cause the first IP agent to be powered on, and thereafter indicate to the OS that the first IP agent is powered on, the OS to thereafter indicate to the first software agent that the first IP agent is powered on.

In an example, the OS is to receive a definition from a BIOS that the plurality of IP agents are associated with the shared power rail, and in response thereto, set up the table.

In an example, the SoC further comprises a shared bus coupled to the plurality of IP agents.

In an example, the power controller is further to block access to the plurality of IP agents and disable the shared bus when the plurality of IP agents are in the idle state.

In an example, the idle state comprises at least a device D3 low power state.

In an example, in response to the indication, the power controller is to maintain the shared power rail powered down for a boot cycle of the SoC.

In another example, a method comprises: receiving, in a power controller of a SoC, an indication that a plurality of IP agents coupled to a common power rail of the SoC are in an idle state; in response to the indication, causing the common power rail to be powered off; and allocating at least a portion of a power budget allocated to the plurality of IP agents to at least one other component of the SoC.

In an example, the method further comprises: receiving a request to wake at least one of the plurality of IP agents; in response to the request, powering on the common power rail; and thereafter causing the at least one IP agent to be powered on.

In an example, the method further comprises: receiving a first power down indication to indicate that a first IP agent of the plurality of agents is to enter the idle state; and updating a table to identify that the first IP agent is in the idle state.

In an example, the method further comprises sending the indication to the power controller in response to the table identifying that the plurality of IP agents are in the idle state.

In an example, the method further comprises: receiving, from a firmware of the SoC, a declaration that the plurality of IP agents are coupled to the common power rail; and setting up the table in response to the declaration.

In an example, the method further comprises sending the indication to the power controller in response to the table identifying that the plurality of agents are in the idle state and further based on the declaration.

In another example, a computer readable medium including instructions is to perform the method of any of the above examples.

In another example, a computer readable medium including data is to be used by at least one machine to fabricate at least one integrated circuit to perform the method of any one of the above examples.

In another example, an apparatus comprises means for performing the method of any one of the above examples.

In another example, a system includes an integrated circuit comprising: at least one core; a plurality of IP agents coupled to the at least one core; a shared power rail to provide an operating voltage to a first subset of the plurality of IP agents; and a power controller, in response to an indication that the first subset of the plurality of IP agents are in an idle state, to power down the shared power rail while the at least one core remains in the active state. The system may further include a non-volatile storage coupled to the integrated circuit to store firmware for the system, the firmware comprising a definition to identify that the first subset of the plurality of IP agents are coupled to the shared power rail, and a volatile memory to store at least a portion of an OS, where the OS is to receive the definition and set up a table in the volatile memory, the table including a plurality of entries each to identify one of the first subset of the plurality of IP agents and a corresponding power state for the IP agent.

In an example, the OS is to update a first entry of the table to indicate that a first IP agent of the first subset of the plurality of IP agents is to be in the idle state, in response to a power down message from a first software agent.

In an example, the power controller is to receive a request to wake the first IP agent, in response to the request, power on the shared power rail, and thereafter cause the first IP agent to be powered on.

In an example, the power controller is to allocate at least a portion of a power budget allocated to the first subset of the plurality of IP agents to the at least one core when the shared power rail is powered down.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system on chip (SoC) comprising:
at least one core;
a plurality of intellectual property (IP) agents coupled to the at least one core;
a shared power rail to provide an operating voltage to the plurality of IP agents; and
a power controller, in response to an indication that both the plurality of IP agents are in an idle state and the at least one core is in an active state, to power down the shared power rail while the at least one core remains in the active state.

2. The SoC of claim 1, wherein a first software agent is to inform an operating system (OS) that a first IP agent is to enter into the idle state, the OS to maintain a table including a plurality of entries, each associated with one of the plurality of IP agents.

3. The SoC of claim 2, wherein the OS is to update a first entry of the table to indicate that the first IP agent is to be in the idle state.

4. The SoC of claim 2, wherein the OS is to receive a definition from a basic input/output system (BIOS) that the plurality of IP agents are associated with the shared power rail, and in response thereto, set up the table.

5. The SoC of claim 1, wherein the power controller is to receive a power down message from an operating system in response to a determination that at least one of the plurality of IP agents has entered the idle state, the power down message comprising the indication.

6. The SoC of claim 1, wherein the power controller, in response to a request to power on a first IP agent, is to power on the shared power rail, thereafter cause the first IP agent to be powered on, and thereafter indicate to an operating system (OS) that the first IP agent is powered on, the OS to thereafter indicate to a first software agent that the first IP agent is powered on.

7. The SoC of claim 1, further comprising a shared bus coupled to the plurality of IP agents.

8. The SoC of claim 7, wherein the power controller is further to block access to the plurality of IP agents and disable the shared bus when the plurality of IP agents are in the idle state.

9. The SoC of claim 1, wherein the idle state comprises at least a device D3 low power state.

10. The SoC of claim 1, wherein in response to the indication, the power controller is to maintain the shared power rail powered down for a boot cycle of the SoC.

11. At least one non-transitory computer readable storage medium having stored thereon instructions, which if performed by a machine cause the machine to perform a method comprising:
receiving, from a firmware of a system on chip (SoC) having a plurality of intellectual property (IP) agents, a declaration that the plurality of IP agents are coupled to a common power rail;
setting up a table in response to the declaration;
receiving, in a power controller of the SoC, an indication that the plurality of IP agents are in an idle state;
in response to the indication, causing the common power rail to be powered off; and
allocating at least a portion of a power budget allocated to the plurality of IP agents to at least one other component of the SoC.

12. The at least one non-transitory computer readable storage medium of claim 11, wherein the method further comprises:
receiving a request to wake at least one of the plurality of IP agents;
in response to the request, powering on the common power rail; and
thereafter causing the at least one IP agent to be powered on.

13. The at least one non-transitory computer readable storage medium of claim 11, wherein the method further comprises:
receiving a first power down indication to indicate that a first IP agent of the plurality of IP agents is to enter the idle state; and
updating the table to identify that the first IP agent is in the idle state.

14. The at least one non-transitory computer readable storage medium of claim 13, wherein the method further comprises sending the indication to the power controller in response to the table identifying that the plurality of IP agents are in the idle state.

15. The at least one non-transitory computer readable storage medium of claim 14, wherein the method further comprises sending the indication to the power controller further based on the declaration.

16. A system comprising:
an integrated circuit comprising:
at least one core;
a plurality of intellectual property (IP) agents coupled to the at least one core;
a shared power rail to provide an operating voltage to a first subset of the plurality of IP agents; and
a power controller, in response to an indication that the first subset of the plurality of IP agents are in an idle state, to power down the shared power rail while the at least one core remains in the active state;
a non-volatile storage coupled to the integrated circuit to store firmware for the system, the firmware comprising a definition to identify that the first subset of the plurality of IP agents are coupled to the shared power rail; and
a volatile memory to store at least a portion of an operating system (OS), wherein the OS is to receive the definition and set up a table in the volatile memory, the table including a plurality of entries each to identify one of the first subset of the plurality of IP agents and a corresponding power state for the IP agent.

17. The system of claim 16, wherein the OS is to update a first entry of the table to indicate that a first IP agent of the first subset of the plurality of IP agents is to be in the idle state, in response to a power down message from a first software agent.

18. The system of claim 17, wherein the power controller is to receive a request to wake the first IP agent, in response to the request, power on the shared power rail, and thereafter cause the first IP agent to be powered on.

19. The system of claim 16, wherein the power controller is to allocate at least a portion of a power budget allocated to the first subset of the plurality of IP agents to the at least one core when the shared power rail is powered down.

* * * * *

UNITED STATES PATENT AND TRADEMARK OFFICE
CERTIFICATE OF CORRECTION

PATENT NO. : 10,860,083 B2  
APPLICATION NO. : 16/142320  
DATED : December 8, 2020  
INVENTOR(S) : Vijay S. R. Degalahal et al.

Page 1 of 1

It is certified that error appears in the above-identified patent and that said Letters Patent is hereby corrected as shown below:

On the Title Page

Item (72):  
"(72) Inventors: Vijay S. R. Degalahal, Bangalore (IN);  
Pronay Dutta, Portland, OR (US);  
Robert Gough, Beaverton, OR (US);  
Panner Kumar, Bangalore (IN);  
Chia - Hung Kuo, Folsom, CA (US);  
Karthi Vadivelu, Folsom, CA (US)"

Should be:  
--(72) Inventors: Vijay S. R. Degalahal, Bangalore (IN);  
Pronay Dutta, Portland, OR (US);  
Robert Gough, Beaverton, OR (US);  
Pannerkumar Rajagopal, Bangalore (IN);  
Chia - Hung Kuo, Folsom, CA (US);  
Karthi Vadivelu, Folsom, CA (US)--

Signed and Sealed this  
Sixth Day of July, 2021

Drew Hirshfeld  
*Performing the Functions and Duties of the*  
*Under Secretary of Commerce for Intellectual Property and*  
*Director of the United States Patent and Trademark Office*